(12) United States Patent
Chen et al.

(10) Patent No.: US 8,479,189 B2
(45) Date of Patent: *Jul. 2, 2013

(54) PATTERN DETECTION PREPROCESSOR IN AN ELECTRONIC DEVICE UPDATE GENERATION SYSTEM

(75) Inventors: Shao-Chun Chen, Aliso Viejo, CA (US); Patrick O'Neill, Dana Point, CA (US); Bindu Rama Rao, Austin, TX (US); Patrick Lilley, Irvine, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 2338 days.

This patent is subject to a terminal disclaimer.

(21) Appl. No.: 10/412,045

(22) Filed: Apr. 11, 2003

(65) Prior Publication Data

US 2007/0028226 A1    Feb. 1, 2007

Related U.S. Application Data

(63) Continuation-in-part of application No. 10/311,462, filed as application No. PCT/US01/44034 on Nov. 19, 2001.

(60) Provisional application No. 60/249,606, filed on Nov. 17, 2000, provisional application No. 60/373,421, filed on Apr. 12, 2002, provisional application No. 60/373,422, filed on Apr. 12, 2002, provisional application No. 60/373,423, filed on Apr. 12, 2002, provisional application No. 60/372,066, filed on Apr. 12, 2002.

(51) Int. Cl.
*G06F 9/445* (2006.01)

(52) U.S. Cl.
USPC ............................. 717/170; 717/171; 717/173

(58) Field of Classification Search
USPC ............................................................ 717/170
See application file for complete search history.

(56) References Cited

U.S. PATENT DOCUMENTS

| 4,337,376 A | 6/1982 | Gruenberg |
| 4,344,091 A | 8/1982 | Gardner et al. |
| 4,429,387 A | 1/1984 | Kaminski |

(Continued)

FOREIGN PATENT DOCUMENTS

| CA | 2339923 | 3/2000 |
| CA | 2414281 | 5/2002 |

(Continued)

OTHER PUBLICATIONS

Tansley, "Linux and Unix Shell Programming" Dec. 27, 1999, Addison-Wesley Professional, 2 pages.*

(Continued)

*Primary Examiner* — James D Rutten

(57) ABSTRACT

A generator for generating an update package for efficiently updating the software and/or firmware in an electronic device, and a method for operating such a generator are disclosed. An embodiment of the disclosed invention may produce a compact update package comprising a set of instructions that may be executed within the electronic device to produce an updated binary image of the software and/or firmware. Pre-processing of the existing or new binary image may result in a further reduction in the size of the update package, shortening the time needed to transmit the update package to the electronic device.

16 Claims, 4 Drawing Sheets

U.S. PATENT DOCUMENTS

| | | | |
|---|---|---|---|
| 4,493,083 A | 1/1985 | Kinoshita | |
| 4,783,841 A | 11/1988 | Crayson | |
| 4,807,182 A | 2/1989 | Queen | |
| 4,809,170 A | 2/1989 | Leblang et al. | |
| 5,084,816 A | 1/1992 | Boese et al. | |
| 5,155,847 A | 10/1992 | Kirouac et al. | |
| 5,204,960 A | 4/1993 | Smith et al. | |
| 5,261,055 A | 11/1993 | Moran et al. | |
| 5,274,823 A | 12/1993 | Brenner et al. | |
| 5,325,531 A | 6/1994 | McKeeman et al. | |
| 5,392,353 A | 2/1995 | Morales | |
| 5,410,703 A | 4/1995 | Nilsson et al. | |
| 5,418,837 A | 5/1995 | Johansson et al. | |
| 5,420,616 A * | 5/1995 | Suemitsu et al. | 347/154 |
| 5,421,006 A | 5/1995 | Jablon et al. | |
| 5,442,771 A | 8/1995 | Filepp et al. | |
| 5,444,765 A | 8/1995 | Marui et al. | |
| 5,450,589 A | 9/1995 | Maebayashi et al. | |
| 5,463,766 A | 10/1995 | Schieve et al. | |
| 5,471,592 A | 11/1995 | Gove et al. | |
| 5,479,637 A | 12/1995 | Lisimaque et al. | |
| 5,479,654 A | 12/1995 | Squibb | |
| 5,481,713 A | 1/1996 | Wetmore et al. | |
| 5,491,807 A | 2/1996 | Freeman et al. | |
| 5,491,821 A | 2/1996 | Kilis | |
| 5,535,357 A | 7/1996 | Moran et al. | |
| 5,563,931 A | 10/1996 | Bishop et al. | |
| 5,579,522 A | 11/1996 | Christeson et al. | |
| 5,586,328 A | 12/1996 | Caron et al. | |
| 5,594,903 A * | 1/1997 | Bunnell et al. | 717/162 |
| 5,596,738 A | 1/1997 | Pope | |
| 5,598,531 A | 1/1997 | Hill | |
| 5,598,534 A | 1/1997 | Haas | |
| 5,606,693 A | 2/1997 | Nilsen et al. | |
| 5,608,910 A | 3/1997 | Shimakura | |
| 5,623,604 A | 4/1997 | Russell et al. | |
| 5,628,016 A | 5/1997 | Kukol | |
| 5,649,112 A | 7/1997 | Yeager et al. | |
| 5,649,200 A | 7/1997 | Leblang et al. | |
| 5,666,293 A | 9/1997 | Metz et al. | |
| 5,675,628 A | 10/1997 | Hokkanen | |
| 5,677,708 A | 10/1997 | Matthews, III | |
| 5,689,712 A | 11/1997 | Heisch | |
| 5,704,031 A | 12/1997 | Mikami et al. | |
| 5,708,709 A | 1/1998 | Rose | |
| 5,715,462 A | 2/1998 | Iwamoto et al. | |
| 5,717,737 A | 2/1998 | Doviak et al. | |
| 5,721,824 A | 2/1998 | Taylor | |
| 5,724,526 A | 3/1998 | Kunita | |
| 5,727,202 A | 3/1998 | Kucala | |
| 5,729,735 A | 3/1998 | Meyering | |
| 5,752,039 A | 5/1998 | Tanimura | |
| 5,752,042 A | 5/1998 | Cole et al. | |
| 5,764,658 A * | 6/1998 | Sekiguchi et al. | 714/752 |
| 5,774,715 A | 6/1998 | Madany et al. | |
| 5,778,440 A | 7/1998 | Yiu et al. | |
| 5,781,921 A | 7/1998 | Nichols | |
| 5,790,860 A | 8/1998 | Wetmore et al. | |
| 5,790,974 A | 8/1998 | Tognazzini | |
| 5,794,254 A | 8/1998 | McClain | |
| 5,802,554 A | 9/1998 | Caceres et al. | |
| 5,805,899 A | 9/1998 | Evans et al. | |
| 5,809,251 A | 9/1998 | May et al. | |
| 5,815,722 A | 9/1998 | Kalwitz et al. | |
| 5,822,692 A | 10/1998 | Krishan et al. | |
| 5,826,012 A | 10/1998 | Lettvin | |
| 5,832,000 A | 11/1998 | Lin et al. | |
| 5,832,520 A * | 11/1998 | Miller | 707/203 |
| 5,835,777 A | 11/1998 | Staelin | |
| 5,838,981 A | 11/1998 | Gotoh | |
| 5,845,077 A | 12/1998 | Fawcett | |
| 5,875,404 A | 2/1999 | Messiet | |
| 5,878,124 A | 3/1999 | Griesmer et al. | |
| 5,878,256 A | 3/1999 | Bealkowski et al. | |
| 5,881,292 A * | 3/1999 | Sigal et al. | 717/170 |
| 5,896,566 A | 4/1999 | Averbuch et al. | |
| 5,901,310 A | 5/1999 | Rahman et al. | |
| 5,901,330 A | 5/1999 | Sun et al. | |
| 5,913,027 A | 6/1999 | Matsuda et al. | |
| 5,919,247 A * | 7/1999 | Van Hoff et al. | 709/217 |
| 5,930,504 A | 7/1999 | Gabel | |
| 5,931,909 A | 8/1999 | Taylor | |
| 5,933,498 A | 8/1999 | Schneck et al. | |
| 5,937,019 A | 8/1999 | Padovani | |
| 5,943,406 A | 8/1999 | Leta et al. | |
| 5,944,839 A | 8/1999 | Isenberg | |
| 5,953,653 A | 9/1999 | Josenhans et al. | |
| 5,954,817 A | 9/1999 | Janssen et al. | |
| 5,960,189 A | 9/1999 | Stupek, Jr. et al. | |
| 5,960,445 A | 9/1999 | Tamori et al. | |
| 5,968,182 A | 10/1999 | Chen et al. | |
| 5,974,179 A * | 10/1999 | Caklovic | 382/232 |
| 5,974,250 A | 10/1999 | Angelo et al. | |
| 5,974,454 A | 10/1999 | Apfel et al. | |
| 5,987,325 A | 11/1999 | Tayloe | |
| 5,999,978 A | 12/1999 | Angal et al. | |
| 6,006,034 A | 12/1999 | Heath et al. | |
| 6,009,274 A | 12/1999 | Fletcher et al. | |
| 6,009,497 A | 12/1999 | Wells et al. | |
| 6,011,973 A | 1/2000 | Valentine et al. | |
| 6,014,561 A | 1/2000 | Molne | |
| 6,018,747 A | 1/2000 | Burns et al. | |
| 6,021,415 A | 2/2000 | Cannon et al. | |
| 6,021,428 A | 2/2000 | Miloslavsky | |
| 6,029,004 A | 2/2000 | Bortnikov et al. | |
| 6,031,830 A | 2/2000 | Cowan | |
| 6,032,044 A | 2/2000 | Shannon et al. | |
| 6,038,636 A | 3/2000 | Brown, III et al. | |
| 6,041,333 A | 3/2000 | Bretschneider et al. | |
| 6,044,270 A | 3/2000 | Raith | |
| 6,044,403 A | 3/2000 | Gerszberg | |
| 6,047,242 A | 4/2000 | Benson | |
| 6,047,279 A | 4/2000 | Barrack et al. | |
| 6,052,531 A | 4/2000 | Waldin et al. | |
| 6,052,600 A | 4/2000 | Fette et al. | |
| 6,058,435 A | 5/2000 | Sassin et al. | |
| 6,064,814 A | 5/2000 | Capriles et al. | |
| 6,070,012 A | 5/2000 | Eitner et al. | |
| 6,070,142 A | 5/2000 | McDonough et al. | |
| 6,073,206 A | 6/2000 | Piwonka et al. | |
| 6,073,214 A | 6/2000 | Fawcett | |
| 6,077,315 A | 6/2000 | Greenbaum et al. | |
| 6,080,207 A | 6/2000 | Kroening et al. | |
| 6,081,518 A | 6/2000 | Bowman-Amuah | |
| 6,081,731 A | 6/2000 | Boltz et al. | |
| 6,088,759 A | 7/2000 | Hasbun et al. | |
| 6,097,942 A | 8/2000 | Laiho | |
| 6,097,966 A | 8/2000 | Hanley | |
| 6,105,063 A | 8/2000 | Hayes, Jr. | |
| 6,112,024 A | 8/2000 | Almond et al. | |
| 6,112,197 A | 8/2000 | Chatterjee et al. | |
| 6,115,693 A | 9/2000 | McDonough et al. | |
| 6,115,737 A | 9/2000 | Ely et al. | |
| 6,117,187 A | 9/2000 | Staelin | |
| 6,126,327 A | 10/2000 | Bi et al. | |
| 6,128,695 A | 10/2000 | Estakhri et al. | |
| 6,128,713 A | 10/2000 | Eisler et al. | |
| 6,131,096 A | 10/2000 | Ng et al. | |
| 6,134,530 A | 10/2000 | Bunting et al. | |
| 6,138,002 A | 10/2000 | Alperovich et al. | |
| 6,138,239 A | 10/2000 | Veil | |
| 6,138,249 A | 10/2000 | Nolet | |
| 6,141,564 A | 10/2000 | Bruner et al. | |
| 6,145,012 A | 11/2000 | Small | |
| 6,148,192 A | 11/2000 | Ahvenainen | |
| 6,148,441 A | 11/2000 | Woodward | |
| 6,151,643 A | 11/2000 | Cheng et al. | |
| 6,157,559 A | 12/2000 | Yoo | |
| 6,163,274 A | 12/2000 | Lindgren | |
| 6,167,567 A | 12/2000 | Chiles et al. | |
| 6,178,452 B1 | 1/2001 | Miyamoyo | |
| 6,189,096 B1 | 2/2001 | Haverty | |
| 6,195,546 B1 | 2/2001 | Leung et al. | |
| 6,195,946 B1 | 3/2001 | Lott et al. | |
| 6,198,946 B1 | 3/2001 | Shin et al. | |
| 6,199,204 B1 | 3/2001 | Donohue | |
| 6,202,207 B1 | 3/2001 | Donohue | |

| Patent No. | Date | Inventor |
|---|---|---|
| 6,209,111 B1 | 3/2001 | Kadyk et al. |
| 6,209,127 B1 | 3/2001 | Mori et al. |
| 6,212,281 B1 | 4/2001 | Vanstone |
| 6,212,489 B1 | 4/2001 | Klein et al. |
| 6,212,659 B1 | 4/2001 | Zehavi |
| 6,230,319 B1 | 5/2001 | Britt, Jr. et al. |
| 6,233,332 B1 | 5/2001 | Anderson et al. |
| 6,256,497 B1 | 7/2001 | Chambers |
| 6,262,973 B1 | 7/2001 | Shiraishi et al. |
| 6,263,214 B1 | 7/2001 | Yazaki et al. |
| 6,266,809 B1 | 7/2001 | Craig et al. |
| 6,272,333 B1 | 8/2001 | Smith |
| 6,278,449 B1 | 8/2001 | Sugiarto et al. |
| 6,279,153 B1 | 8/2001 | Bi et al. |
| 6,282,709 B1 | 8/2001 | Reha et al. |
| 6,289,509 B1 | 9/2001 | Kryloff |
| 6,292,492 B1 | 9/2001 | Bonomi et al. |
| 6,301,710 B1 | 10/2001 | Fujiwara |
| 6,308,061 B1 | 10/2001 | Criss et al. |
| 6,311,322 B1 | 10/2001 | Ikeda et al. |
| 6,317,872 B1 | 11/2001 | Gee et al. |
| 6,321,263 B1 | 11/2001 | Luzzi et al. |
| 6,321,348 B1 | 11/2001 | Kobata |
| 6,324,402 B1 | 11/2001 | Waugh et al. |
| 6,333,980 B1 | 12/2001 | Hollatz et al. |
| 6,334,212 B1 | 12/2001 | Nakajma |
| 6,343,379 B1 | 1/2002 | Ozawa et al. |
| 6,345,288 B1 | 2/2002 | Reed et al. |
| 6,347,331 B1 | 2/2002 | Dutcher et al. |
| 6,349,205 B1 | 2/2002 | Fang et al. |
| 6,353,737 B1 | 3/2002 | Herzog |
| 6,357,021 B1 | 3/2002 | Kitagawa et al. |
| 6,360,362 B1 | 3/2002 | Fichtner et al. |
| 6,360,366 B1 | 3/2002 | Heath et al. |
| 6,366,584 B1 | 4/2002 | Gulliford et al. |
| 6,366,777 B1 | 4/2002 | Uusitalo |
| 6,367,072 B1 | 4/2002 | Justice et al. |
| 6,374,250 B2 | 4/2002 | Ajtai et al. |
| 6,381,740 B1 | 4/2002 | Miller et al. |
| 6,381,742 B2 | 4/2002 | Forbes et al. |
| 6,389,464 B1 | 5/2002 | Krishnamurthy et al. |
| 6,393,018 B2 | 5/2002 | Miloslavsky |
| 6,393,585 B1 | 5/2002 | Houha et al. |
| 6,397,385 B1 | 5/2002 | Kravitz |
| 6,400,965 B1 | 6/2002 | Phillips et al. |
| 6,405,364 B1 | 6/2002 | Bowman-Amuah |
| 6,408,175 B1 | 6/2002 | Park |
| 6,408,434 B1 | 6/2002 | Fujiwara |
| 6,418,311 B1 | 7/2002 | Chmaytelli et al. |
| 6,421,776 B1 | 7/2002 | Hillis et al. |
| 6,425,125 B1 | 7/2002 | Fries et al. |
| 6,426,955 B1 | 7/2002 | Gossett-Dalton, Jr. et al. |
| 6,438,585 B2 | 8/2002 | Mousseau et al. |
| 6,442,660 B1 | 8/2002 | Henerlau et al. |
| 6,442,754 B1 | 8/2002 | Curtis |
| 6,445,914 B1 | 9/2002 | Findikli et al. |
| 6,446,206 B1 | 9/2002 | Feldbaum |
| 6,449,270 B1 | 9/2002 | Miloslavsky |
| 6,456,732 B1 | 9/2002 | Kimbell et al. |
| 6,456,843 B1 | 9/2002 | Daly |
| 6,457,175 B1 | 9/2002 | Lerche |
| 6,463,300 B1 | 10/2002 | Oshima |
| 6,466,999 B1 * | 10/2002 | Sliger et al. .............. 710/68 |
| 6,477,531 B1 | 11/2002 | Sullivan et al. |
| 6,477,703 B1 | 11/2002 | Smith et al. |
| 6,487,403 B2 | 11/2002 | Carroll |
| 6,487,717 B1 | 11/2002 | Brunemann et al. |
| 6,493,871 B1 | 12/2002 | McGuire et al. |
| 6,504,932 B1 | 1/2003 | Vasnier et al. |
| 6,505,228 B1 | 1/2003 | Schoening et al. |
| 6,526,574 B1 * | 2/2003 | Jones .............. 717/168 |
| 6,529,729 B1 | 3/2003 | Nodoushani et al. |
| 6,530,036 B1 | 3/2003 | Frey, Jr. |
| 6,535,894 B1 | 3/2003 | Schmidt et al. |
| 6,536,038 B1 | 3/2003 | Ewertz et al. |
| 6,542,504 B1 | 4/2003 | Mahler et al. |
| 6,542,906 B2 | 4/2003 | Korn |
| 6,546,243 B2 | 4/2003 | Tiedemann, Jr. et al. |
| 6,546,492 B1 | 4/2003 | Walker et al. |
| 6,546,552 B1 * | 4/2003 | Peleg .............. 717/170 |
| 6,549,770 B1 | 4/2003 | Marran |
| 6,553,113 B1 | 4/2003 | Dhir et al. |
| 6,556,842 B1 | 4/2003 | Ericsson |
| 6,564,369 B1 | 5/2003 | Hove et al. |
| 6,571,244 B1 | 5/2003 | Larson |
| 6,574,657 B1 | 6/2003 | Dickenson |
| 6,577,229 B1 | 6/2003 | Bonneau et al. |
| 6,581,105 B2 | 6/2003 | Miloslavsky et al. |
| 6,587,684 B1 | 7/2003 | Hsu et al. |
| 6,587,685 B2 | 7/2003 | Mittal et al. |
| 6,591,095 B1 | 7/2003 | Palaniswamy et al. |
| 6,591,098 B1 | 7/2003 | Shieh et al. |
| 6,594,723 B1 | 7/2003 | Chapman et al. |
| 6,594,822 B1 * | 7/2003 | Schweitz et al. .............. 717/140 |
| 6,595,856 B1 | 7/2003 | Ginsburg et al. |
| 6,601,153 B1 | 7/2003 | Engelbrecht et al. |
| 6,601,212 B1 | 7/2003 | Guha et al. |
| 6,603,854 B1 | 8/2003 | Judkins et al. |
| 6,603,968 B2 | 8/2003 | Anvekar et al. |
| 6,606,744 B1 | 8/2003 | Mikurak |
| 6,615,038 B1 | 9/2003 | Moles et al. |
| 6,615,240 B1 | 9/2003 | Sullivan et al. |
| 6,615,404 B1 | 9/2003 | Garfunkel et al. |
| 6,622,017 B1 | 9/2003 | Hoffman |
| 6,625,451 B1 | 9/2003 | La Medica et al. |
| 6,640,334 B1 | 10/2003 | Rasmussen |
| 6,643,506 B1 | 11/2003 | Criss et al. |
| 6,647,260 B2 | 11/2003 | Dusse et al. |
| 6,651,249 B2 | 11/2003 | Waldin et al. |
| 6,658,090 B1 | 12/2003 | Harjunen et al. |
| 6,659,345 B2 | 12/2003 | Sukeda et al. |
| 6,665,376 B1 | 12/2003 | Brown |
| 6,665,861 B1 | 12/2003 | Francis et al. |
| 6,668,049 B1 | 12/2003 | Koch et al. |
| 6,668,336 B2 | 12/2003 | Lasser |
| 6,671,265 B1 | 12/2003 | Hwang et al. |
| 6,675,201 B1 | 1/2004 | Parkkinen |
| 6,675,382 B1 | 1/2004 | Foster |
| 6,683,993 B1 | 1/2004 | Mead |
| 6,684,396 B1 | 1/2004 | Brittain et al. |
| 6,687,341 B1 | 2/2004 | Koch et al. |
| 6,687,901 B1 | 2/2004 | Imamatsu |
| 6,690,788 B1 | 2/2004 | Bauer et al. |
| 6,694,314 B1 | 2/2004 | Sullivan et al. |
| 6,694,336 B1 | 2/2004 | Multer et al. |
| 6,697,808 B1 | 2/2004 | Hurwood et al. |
| 6,697,969 B1 | 2/2004 | Merriam |
| 6,698,013 B1 | 2/2004 | Bertero et al. |
| 6,704,303 B1 | 3/2004 | Bowman-Amuah |
| 6,714,642 B2 | 3/2004 | Dhir et al. |
| 6,721,713 B1 | 4/2004 | Guheen et al. |
| 6,721,946 B1 | 4/2004 | Fogarty et al. |
| 6,725,048 B2 | 4/2004 | Mao et al. |
| 6,725,056 B1 | 4/2004 | Moles et al. |
| 6,725,392 B1 | 4/2004 | Frey et al. |
| 6,728,531 B1 | 4/2004 | Lee et al. |
| 6,728,950 B2 | 4/2004 | Davies et al. |
| 6,730,027 B2 | 5/2004 | Iliff |
| 6,731,932 B1 | 5/2004 | Rune et al. |
| 6,741,848 B2 | 5/2004 | Timonen et al. |
| 6,741,934 B2 | 5/2004 | Chen et al. |
| 6,741,980 B1 | 5/2004 | Langseth et al. |
| 6,742,025 B2 | 5/2004 | Jennery et al. |
| 6,754,181 B1 | 6/2004 | Elliott et al. |
| 6,754,895 B1 | 6/2004 | Bartel et al. |
| 6,754,896 B2 | 6/2004 | Mishra et al. |
| 6,757,263 B1 | 6/2004 | Olds |
| 6,760,730 B1 | 7/2004 | Kataoka |
| 6,763,104 B1 | 7/2004 | Judkins et al. |
| 6,763,403 B2 | 7/2004 | Cheng et al. |
| 6,772,338 B1 | 8/2004 | Hull |
| 6,775,267 B1 | 8/2004 | Kung et al. |
| 6,775,423 B2 | 8/2004 | Kulkarni et al. |
| 6,779,177 B1 | 8/2004 | Bahrs et al. |
| 6,785,834 B2 | 8/2004 | Chefalas et al. |
| 6,789,215 B1 | 9/2004 | Rupp et al. |
| 6,798,876 B1 | 9/2004 | Bala |
| 6,799,155 B1 | 9/2004 | Lindemann et al. |

| | | |
|---|---|---|
| 6,802,061 B1 | 10/2004 | Parthasarathy et al. |
| 6,807,574 B1 | 10/2004 | Partovi et al. |
| 6,813,571 B2 | 11/2004 | Lightbody et al. |
| 6,816,719 B1 | 11/2004 | Heinonen et al. |
| 6,820,214 B1 | 11/2004 | Cabrera et al. |
| 6,820,259 B1 | 11/2004 | Kawamata et al. |
| 6,823,432 B2 | 11/2004 | Chen et al. |
| 6,832,373 B2 | 12/2004 | O'Neill |
| 6,836,657 B2 | 12/2004 | Ji et al. |
| 6,839,841 B1 | 1/2005 | Medvinsky et al. |
| 6,842,628 B1 | 1/2005 | Arnold et al. |
| 6,845,370 B2 | 1/2005 | Burkey et al. |
| 6,847,970 B2 | 1/2005 | Keller et al. |
| 6,850,533 B2 | 2/2005 | Gerszberg et al. |
| 6,850,614 B1 | 2/2005 | Collins |
| 6,856,676 B1 | 2/2005 | Pirot et al. |
| 6,873,988 B2 | 3/2005 | Herrmann et al. |
| 6,879,685 B1 | 4/2005 | Peterson et al. |
| 6,880,051 B2 | 4/2005 | Timpanaro-Perrotta |
| 6,883,168 B1 | 4/2005 | James et al. |
| 6,885,862 B1 | 4/2005 | Pearson |
| 6,889,054 B2 | 5/2005 | Himmel et al. |
| 6,895,387 B1 | 5/2005 | Roberts et al. |
| 6,904,405 B2 | 6/2005 | Suominen |
| 6,918,112 B2 | 7/2005 | Bourke-Dunphy et al. |
| 6,922,722 B1 | 7/2005 | Mann et al. |
| 6,925,300 B2 | 8/2005 | Horne |
| 6,925,467 B2 * | 8/2005 | Gu et al. ................ 707/101 |
| 6,928,108 B2 | 8/2005 | Nelson et al. |
| 6,928,468 B2 | 8/2005 | Leermakers |
| 6,941,129 B2 | 9/2005 | Marce et al. |
| 6,941,453 B2 | 9/2005 | Rao |
| 6,944,621 B1 | 9/2005 | Collart |
| 6,948,099 B1 | 9/2005 | Tallam |
| 6,948,104 B2 | 9/2005 | Herley et al. |
| 6,950,660 B1 | 9/2005 | Hsu et al. |
| 6,956,846 B2 | 10/2005 | Lewis et al. |
| 6,957,041 B2 | 10/2005 | Christensen et al. |
| 6,957,062 B2 | 10/2005 | Castrogiovanni et al. |
| 6,966,058 B2 | 11/2005 | Earl et al. |
| 6,968,179 B1 | 11/2005 | De Vries |
| 6,968,543 B2 | 11/2005 | Takahara et al. |
| 6,970,181 B1 | 11/2005 | Fadel |
| 6,970,189 B1 | 11/2005 | Bernstein et al. |
| 6,981,020 B2 | 12/2005 | Miloslavsky et al. |
| 6,983,458 B1 | 1/2006 | Honda |
| 6,986,133 B2 | 1/2006 | O'Brien et al. |
| 6,990,656 B2 | 1/2006 | Ersek et al. |
| 6,990,660 B2 | 1/2006 | Moshir et al. |
| 6,996,603 B1 | 2/2006 | Srinivasan |
| 6,999,990 B1 | 2/2006 | Sullivan et al. |
| 7,002,919 B1 | 2/2006 | El-Sayed |
| 7,003,534 B2 * | 2/2006 | Peng ................ 707/203 |
| 7,007,049 B2 | 2/2006 | Peng |
| 7,024,557 B1 | 4/2006 | Moles et al. |
| 7,027,586 B2 | 4/2006 | Bushey et al. |
| 7,031,972 B2 | 4/2006 | Ren et al. |
| 7,032,033 B1 | 4/2006 | Ledoux et al. |
| 7,039,594 B1 | 5/2006 | Gersting |
| 7,047,448 B2 | 5/2006 | Rao et al. |
| 7,050,566 B2 | 5/2006 | Becerra et al. |
| 7,055,098 B2 | 5/2006 | Hull et al. |
| 7,055,148 B2 | 5/2006 | Marsh et al. |
| 7,058,860 B2 | 6/2006 | Miller et al. |
| 7,058,978 B2 | 6/2006 | Feuerstein et al. |
| 7,061,891 B1 | 6/2006 | Kilfoyle et al. |
| 7,062,031 B2 | 6/2006 | Becerra et al. |
| 7,065,347 B1 | 6/2006 | Vikse et al. |
| 7,069,452 B1 | 6/2006 | Hind et al. |
| 7,069,545 B2 | 6/2006 | Wang et al. |
| 7,069,578 B1 | 6/2006 | Prus et al. |
| 7,073,017 B2 | 7/2006 | Yamamoto |
| 7,073,172 B2 | 7/2006 | Chamberlain |
| 7,076,051 B2 | 7/2006 | Brown et al. |
| 7,080,371 B1 | 7/2006 | Arnaiz et al. |
| 7,080,372 B1 | 7/2006 | Cole |
| 7,086,049 B2 | 8/2006 | Goodman |
| 7,089,036 B2 | 8/2006 | Prise |
| 7,089,549 B2 | 8/2006 | Venkiteswaran |
| 7,096,311 B2 | 8/2006 | Chiang |
| 7,099,896 B2 | 8/2006 | Fields et al. |
| 7,103,172 B2 | 9/2006 | Brown et al. |
| 7,106,843 B1 | 9/2006 | Gainsboro et al. |
| 7,110,525 B1 | 9/2006 | Heller et al. |
| 7,111,201 B2 | 9/2006 | Largman et al. |
| 7,117,172 B1 | 10/2006 | Black |
| 7,117,195 B2 | 10/2006 | Chantrain et al. |
| 7,120,909 B1 | 10/2006 | Shibuya |
| 7,130,896 B2 | 10/2006 | Engel et al. |
| 7,136,857 B2 | 11/2006 | Chen et al. |
| 7,137,034 B2 | 11/2006 | Largman et al. |
| 7,143,115 B2 | 11/2006 | Jones et al. |
| 7,143,153 B1 | 11/2006 | Black et al. |
| 7,145,898 B1 | 12/2006 | Elliott |
| 7,146,002 B1 | 12/2006 | Smith et al. |
| 7,146,609 B2 | 12/2006 | Thurston et al. |
| 7,149,508 B2 | 12/2006 | Herle |
| 7,150,015 B2 | 12/2006 | Pace et al. |
| 7,165,173 B1 | 1/2007 | Herle |
| 7,171,660 B2 | 1/2007 | McCaleb et al. |
| 7,181,731 B2 | 2/2007 | Pace et al. |
| 7,194,728 B1 | 3/2007 | Sirota et al. |
| 7,200,390 B1 | 4/2007 | Henager et al. |
| 7,206,576 B2 | 4/2007 | Jain et al. |
| 7,210,010 B2 | 4/2007 | Ogle |
| 7,216,343 B2 | 5/2007 | Das et al. |
| 7,222,340 B2 | 5/2007 | Willis, II |
| 7,230,951 B2 | 6/2007 | Mizell et al. |
| 7,231,411 B1 | 6/2007 | Lu |
| 7,240,356 B2 | 7/2007 | Iki et al. |
| 7,242,929 B2 | 7/2007 | Draluk et al. |
| 7,263,379 B1 | 8/2007 | Parkulo et al. |
| 7,266,371 B1 | 9/2007 | Amin et al. |
| 7,269,821 B2 | 9/2007 | Sahinoja et al. |
| 7,274,911 B2 | 9/2007 | Li |
| 7,275,243 B2 | 9/2007 | Gibbons et al. |
| 7,277,529 B1 | 10/2007 | Wuthnow et al. |
| 7,287,068 B1 * | 10/2007 | Eriksson et al. ................ 709/221 |
| 7,292,846 B2 | 11/2007 | Mittal |
| 7,310,720 B2 | 12/2007 | Cornett |
| 7,313,791 B1 * | 12/2007 | Chen et al. ................ 717/170 |
| 7,324,815 B2 | 1/2008 | Ross et al. |
| 7,349,695 B2 | 3/2008 | Oommen et al. |
| 7,350,205 B2 | 3/2008 | Ji |
| 7,353,533 B2 | 4/2008 | Wright et al. |
| 7,367,027 B1 * | 4/2008 | Chen et al. ................ 717/168 |
| 7,369,851 B2 | 5/2008 | Okonnen et al. |
| 7,373,109 B2 | 5/2008 | Pohja et al. |
| 7,376,711 B2 | 5/2008 | Du et al. |
| 7,405,537 B2 | 7/2008 | Hoffman et al. |
| 7,409,685 B2 | 8/2008 | Chen et al. |
| 7,415,706 B1 | 8/2008 | Raju et al. |
| 7,433,936 B2 | 10/2008 | Zhu et al. |
| 7,461,294 B2 | 12/2008 | Sano |
| 7,469,306 B2 | 12/2008 | Ng |
| 7,493,128 B2 | 2/2009 | Tang et al. |
| 7,500,143 B2 | 3/2009 | Buia et al. |
| 7,509,496 B2 | 3/2009 | Skog et al. |
| 7,509,652 B2 | 3/2009 | Niemi |
| 7,518,504 B2 | 4/2009 | Peeters |
| 7,523,155 B2 | 4/2009 | Hayes, Jr. |
| 7,526,563 B2 | 4/2009 | Ingimundarson et al. |
| 7,555,750 B1 | 6/2009 | Lilley |
| 7,577,722 B1 | 8/2009 | Khandekar et al. |
| 7,584,466 B1 | 9/2009 | Rao |
| 7,657,884 B2 | 2/2010 | Okonnen et al. |
| 7,657,886 B1 | 2/2010 | Chen et al. |
| 7,673,300 B2 | 3/2010 | Herle et al. |
| 7,673,325 B2 | 3/2010 | Vincent et al. |
| 7,680,828 B2 | 3/2010 | Gorelik |
| 7,689,981 B1 | 3/2010 | Gustafson |
| 7,698,698 B2 | 4/2010 | Skan |
| 7,707,570 B2 | 4/2010 | Yoshimura et al. |
| 7,725,889 B2 | 5/2010 | Gustafson et al. |
| 7,739,679 B2 | 6/2010 | Qumei |
| 7,784,065 B2 | 8/2010 | Polivy et al. |
| 7,797,693 B1 | 9/2010 | Gustafson et al. |
| 7,797,695 B2 | 9/2010 | Motta |

| | | | | | | |
|---|---|---|---|---|---|---|
| 7,818,556 B2 | 10/2010 | Lima et al. | 2003/0018889 A1 | 1/2003 | Burnett et al. | |
| 7,823,148 B2 | 10/2010 | Deshpande et al. | 2003/0022663 A1 | 1/2003 | Rajaram et al. | |
| 7,823,155 B2 | 10/2010 | Misra et al. | 2003/0023573 A1 | 1/2003 | Chan et al. | |
| 7,844,964 B2 | 11/2010 | Marolia | 2003/0023849 A1 | 1/2003 | Martin, Jr. | |
| 7,873,714 B2 | 1/2011 | Kaappa et al. | 2003/0023964 A1* | 1/2003 | Rajaram et al. | 717/172 |
| 7,889,869 B2 | 2/2011 | Ypya et al. | 2003/0027563 A1 | 2/2003 | Herle et al. | |
| 8,063,929 B2 | 11/2011 | Kurtz et al. | 2003/0027581 A1 | 2/2003 | Jokinen et al. | |
| 8,099,078 B2 | 1/2012 | Lazaridis | 2003/0033525 A1 | 2/2003 | Rajaram | |
| 2001/0008024 A1 | 7/2001 | Inaba | 2003/0033599 A1 | 2/2003 | Rajaram et al. | |
| 2001/0018673 A1 | 8/2001 | Goldband et al. | 2003/0037075 A1 | 2/2003 | Hannigan et al. | |
| 2001/0029178 A1 | 10/2001 | Criss et al. | 2003/0041125 A1 | 2/2003 | Salomon | |
| 2001/0042112 A1 | 11/2001 | Slivka et al. | 2003/0043180 A1 | 3/2003 | Gusler et al. | |
| 2001/0047363 A1 | 11/2001 | Peng | 2003/0044086 A1 | 3/2003 | Jia et al. | |
| 2001/0047441 A1 | 11/2001 | Robertson | 2003/0046485 A1 | 3/2003 | Zitlaw | |
| 2001/0048728 A1 | 12/2001 | Peng | 2003/0046680 A1 | 3/2003 | Gentry | |
| 2001/0049263 A1 | 12/2001 | Zhang | 2003/0054811 A1 | 3/2003 | Han et al. | |
| 2001/0052066 A1 | 12/2001 | Lee et al. | 2003/0055919 A1 | 3/2003 | Fong et al. | |
| 2001/0053688 A1 | 12/2001 | Rignell et al. | 2003/0061323 A1 | 3/2003 | East et al. | |
| 2001/0055414 A1 | 12/2001 | Thieme | 2003/0061384 A1 | 3/2003 | Nakatani | |
| 2001/0056348 A1 | 12/2001 | Hyde-Thomson et al. | 2003/0065738 A1 | 4/2003 | Yang et al. | |
| 2002/0010702 A1 | 1/2002 | Ajtai et al. | 2003/0066062 A1 | 4/2003 | Brannock et al. | |
| 2002/0023258 A1 | 2/2002 | Elwahab et al. | 2003/0074658 A1 | 4/2003 | Kim | |
| 2002/0030634 A1 | 3/2002 | Noda et al. | 2003/0074672 A1 | 4/2003 | Daniels | |
| 2002/0046400 A1 | 4/2002 | Burch | 2003/0081557 A1 | 5/2003 | Mettala et al. | |
| 2002/0052938 A1 | 5/2002 | Kanemitsu | 2003/0081786 A1 | 5/2003 | Nakano et al. | |
| 2002/0053044 A1 | 5/2002 | Gold et al. | 2003/0084177 A1 | 5/2003 | Mulligan | |
| 2002/0059526 A1 | 5/2002 | Dillon et al. | 2003/0084283 A1 | 5/2003 | Pixton | |
| 2002/0072359 A1 | 6/2002 | Moles et al. | 2003/0084434 A1 | 5/2003 | Ren et al. | |
| 2002/0073304 A1 | 6/2002 | Marsh et al. | 2003/0084435 A1 | 5/2003 | Messer et al. | |
| 2002/0073309 A1 | 6/2002 | Kurn et al. | 2003/0092438 A1 | 5/2003 | Moore et al. | |
| 2002/0075824 A1 | 6/2002 | Willekes et al. | 2003/0100303 A1 | 5/2003 | Armbruster et al. | |
| 2002/0078142 A1 | 6/2002 | Moore et al. | 2003/0101246 A1 | 5/2003 | Lahti | |
| 2002/0078185 A1 | 6/2002 | Swerup et al. | 2003/0101446 A1 | 5/2003 | McManus et al. | |
| 2002/0078209 A1 | 6/2002 | Peng | 2003/0103484 A1 | 6/2003 | Oommen et al. | |
| 2002/0085704 A1 | 7/2002 | Shires | 2003/0110412 A1 | 6/2003 | Neville | |
| 2002/0087668 A1 | 7/2002 | San Martin et al. | 2003/0117956 A1 | 6/2003 | Lee | |
| 2002/0090934 A1 | 7/2002 | Mitchelmore | 2003/0121032 A1 | 6/2003 | Cho et al. | |
| 2002/0091568 A1 | 7/2002 | Kraft et al. | 2003/0131226 A1 | 7/2003 | Spencer et al. | |
| 2002/0091815 A1 | 7/2002 | Anderson et al. | 2003/0133552 A1 | 7/2003 | Pillai et al. | |
| 2002/0092008 A1 | 7/2002 | Kehne | 2003/0143991 A1 | 7/2003 | Minear et al. | |
| 2002/0092010 A1 | 7/2002 | Fiske | 2003/0154471 A1 | 8/2003 | Teachman et al. | |
| 2002/0092011 A1 | 7/2002 | Liu et al. | 2003/0156719 A1 | 8/2003 | Cronce | |
| 2002/0095615 A1 | 7/2002 | Hastings et al. | 2003/0162533 A1 | 8/2003 | Moles et al. | |
| 2002/0099726 A1 | 7/2002 | Crudele et al. | 2003/0172094 A1 | 9/2003 | Lauria et al. | |
| 2002/0100028 A1 | 7/2002 | Kosaka et al. | 2003/0172138 A1 | 9/2003 | McCormack et al. | |
| 2002/0114384 A1 | 8/2002 | Nelson et al. | 2003/0172175 A1 | 9/2003 | McCormack et al. | |
| 2002/0116261 A1 | 8/2002 | Moskowitz et al. | 2003/0177485 A1 | 9/2003 | Waldin et al. | |
| 2002/0116665 A1 | 8/2002 | Pickover et al. | 2003/0182414 A1 | 9/2003 | O'Neill | |
| 2002/0120776 A1 | 8/2002 | Eggebraaten et al. | 2003/0186689 A1 | 10/2003 | Herle et al. | |
| 2002/0120810 A1 | 8/2002 | Brouwer | 2003/0186722 A1 | 10/2003 | Weiner | |
| 2002/0123335 A1 | 9/2002 | Luna et al. | 2003/0188120 A1 | 10/2003 | Maeda | |
| 2002/0124209 A1 | 9/2002 | Faust et al. | 2003/0188156 A1 | 10/2003 | Yasala et al. | |
| 2002/0129355 A1 | 9/2002 | Velten et al. | 2003/0191955 A1 | 10/2003 | Wagner et al. | |
| 2002/0131404 A1 | 9/2002 | Mehta et al. | 2003/0195110 A1 | 10/2003 | Moody et al. | |
| 2002/0144254 A1 | 10/2002 | Owada | 2003/0195753 A1 | 10/2003 | Homuth | |
| 2002/0152005 A1 | 10/2002 | Bagnordi | 2003/0195951 A1 | 10/2003 | Wittel et al. | |
| 2002/0156863 A1 | 10/2002 | Peng | 2003/0196110 A1 | 10/2003 | Lampson et al. | |
| 2002/0157089 A1 | 10/2002 | Patel et al. | 2003/0204640 A1 | 10/2003 | Sahinoja et al. | |
| 2002/0157090 A1 | 10/2002 | Anton, Jr. | 2003/0214919 A1 | 11/2003 | Kilfoyle et al. | |
| 2002/0159479 A1 | 10/2002 | Watanuki et al. | 2003/0217193 A1 | 11/2003 | Thurston et al. | |
| 2002/0162098 A1 | 10/2002 | Suzuki | 2003/0217358 A1 | 11/2003 | Thurston et al. | |
| 2002/0166027 A1 | 11/2002 | Shirasawa et al. | 2003/0221190 A1 | 11/2003 | Deshpande et al. | |
| 2002/0170052 A1 | 11/2002 | Radatti | 2003/0226030 A1 | 12/2003 | Hurst et al. | |
| 2002/0174422 A1 | 11/2002 | Kelley et al. | 2003/0226137 A1 | 12/2003 | Nagao | |
| 2002/0178241 A1 | 11/2002 | Eriksson | 2003/0233649 A1 | 12/2003 | Reimert | |
| 2002/0184619 A1 | 12/2002 | Meyerson | 2004/0006760 A1 | 1/2004 | Gove et al. | |
| 2002/0188886 A1 | 12/2002 | Liu et al. | 2004/0008113 A1 | 1/2004 | Pradhan et al. | |
| 2002/0194532 A1 | 12/2002 | Nagasawa | 2004/0015952 A1 | 1/2004 | Lajoie et al. | |
| 2002/0197991 A1 | 12/2002 | Anvekar et al. | 2004/0017831 A1 | 1/2004 | Shen et al. | |
| 2002/0198971 A1 | 12/2002 | Resnick et al. | 2004/0018831 A1 | 1/2004 | Majmundar et al. | |
| 2002/0198976 A1 | 12/2002 | Davenport | 2004/0031027 A1 | 2/2004 | Hiltgen | |
| 2003/0005108 A1 | 1/2003 | Bartley et al. | 2004/0031029 A1 | 2/2004 | Lee et al. | |
| 2003/0005362 A1 | 1/2003 | Miller et al. | 2004/0031031 A1 | 2/2004 | Rudelic | |
| 2003/0005426 A1 | 1/2003 | Scholtens et al. | 2004/0034853 A1 | 2/2004 | Gibbons et al. | |
| 2003/0009752 A1 | 1/2003 | Gupta | 2004/0038692 A1 | 2/2004 | Muzaffar | |
| 2003/0013434 A1 | 1/2003 | Rosenberg et al. | 2004/0039801 A9 | 2/2004 | Srinivasan et al. | |
| 2003/0018524 A1 | 1/2003 | Fishman et al. | 2004/0040020 A1 | 2/2004 | Yang | |
| 2003/0018764 A1 | 1/2003 | Shell et al. | 2004/0041800 A1 | 3/2004 | Daniels | |
| 2003/0018810 A1 | 1/2003 | Karagiannis et al. | 2004/0043788 A1 | 3/2004 | Mittal | |

| | | | | | | |
|---|---|---|---|---|---|---|
| 2004/0049394 A1 | 3/2004 | Burger et al. | | 2004/0261072 A1 | 12/2004 | Herle et al. |
| 2004/0049609 A1 | 3/2004 | Simonson et al. | | 2004/0261073 A1 | 12/2004 | Herle et al. |
| 2004/0054764 A1 | 3/2004 | Aderton et al. | | 2004/0267481 A1 | 12/2004 | Resnick et al. |
| 2004/0054995 A1 | 3/2004 | Lee | | 2004/0267833 A1 | 12/2004 | Meller et al. |
| 2004/0058651 A1 | 3/2004 | Ross et al. | | 2004/0268041 A1 | 12/2004 | Smith |
| 2004/0058652 A1 | 3/2004 | McGregor et al. | | 2005/0005268 A1 | 1/2005 | Zilavy et al. |
| 2004/0059725 A1 | 3/2004 | Sharangpani et al. | | 2005/0010552 A1 | 1/2005 | Kaappa et al. |
| 2004/0062130 A1 | 4/2004 | Chiang | | 2005/0010585 A1 | 1/2005 | Sahinoja et al. |
| 2004/0068721 A1 | 4/2004 | O'Neill et al. | | 2005/0027867 A1 | 2/2005 | Mueller et al. |
| 2004/0068724 A1 | 4/2004 | Gardner et al. | | 2005/0033774 A1 | 2/2005 | Brentano et al. |
| 2004/0072578 A1 | 4/2004 | Keutmann et al. | | 2005/0033829 A1 | 2/2005 | Oommen |
| 2004/0073901 A1 | 4/2004 | Imamatsu | | 2005/0037762 A1 | 2/2005 | Gurbani et al. |
| 2004/0073912 A1 | 4/2004 | Meza | | 2005/0038955 A1 | 2/2005 | Chen |
| 2004/0078427 A1 | 4/2004 | Gil et al. | | 2005/0039178 A1 | 2/2005 | Marolia et al. |
| 2004/0082346 A1 | 4/2004 | Skytt et al. | | 2005/0055397 A1 | 3/2005 | Zhu et al. |
| 2004/0083472 A1 | 4/2004 | Rao et al. | | 2005/0055453 A1 | 3/2005 | Zhu |
| 2004/0088281 A1 | 5/2004 | Matsuishi | | 2005/0055595 A1 | 3/2005 | Frazer et al. |
| 2004/0088694 A1 | 5/2004 | Ho | | 2005/0060361 A1 | 3/2005 | Chatrath et al. |
| 2004/0092255 A1 | 5/2004 | Ji et al. | | 2005/0060699 A1 | 3/2005 | Kim et al. |
| 2004/0093342 A1 | 5/2004 | Arbo et al. | | 2005/0066019 A1 | 3/2005 | Egan et al. |
| 2004/0093523 A1 | 5/2004 | Matsuzaki et al. | | 2005/0071385 A1 | 3/2005 | Rao |
| 2004/0093557 A1 | 5/2004 | Kawatani | | 2005/0073438 A1 | 4/2005 | Rodgers et al. |
| 2004/0093597 A1 | 5/2004 | Rao et al. | | 2005/0079863 A1 | 4/2005 | Macaluso |
| 2004/0095457 A1 | 5/2004 | Pokomy et al. | | 2005/0084079 A1 | 4/2005 | Lang |
| 2004/0098413 A1 | 5/2004 | Peng | | 2005/0086328 A1 | 4/2005 | Landram et al. |
| 2004/0098421 A1 | 5/2004 | Peng | | 2005/0096025 A1 | 5/2005 | Qumei et al. |
| 2004/0098427 A1 | 5/2004 | Peng | | 2005/0097544 A1 | 5/2005 | Kim |
| 2004/0098715 A1 | 5/2004 | Aghera et al. | | 2005/0102615 A1 | 5/2005 | Roman et al. |
| 2004/0103214 A1 | 5/2004 | Adwankar et al. | | 2005/0114493 A1 | 5/2005 | Mandato et al. |
| 2004/0103340 A1 | 5/2004 | Sundareson et al. | | 2005/0114504 A1 | 5/2005 | Marolia et al. |
| 2004/0107416 A1 | 6/2004 | Buban et al. | | 2005/0114852 A1 | 5/2005 | Chen et al. |
| 2004/0110497 A1 | 6/2004 | Little | | 2005/0132179 A1 | 6/2005 | Glaum et al. |
| 2004/0111582 A1 | 6/2004 | Maeda et al. | | 2005/0132349 A1 | 6/2005 | Roberts et al. |
| 2004/0111702 A1 | 6/2004 | Chan | | 2005/0135286 A1 | 6/2005 | Nurminen et al. |
| 2004/0111723 A1 | 6/2004 | Moles et al. | | 2005/0136942 A1 | 6/2005 | Timiri et al. |
| 2004/0117322 A1 | 6/2004 | Bjorksten et al. | | 2005/0144609 A1 | 6/2005 | Rothman et al. |
| 2004/0117760 A1 | 6/2004 | McFarling | | 2005/0144612 A1 | 6/2005 | Wang et al. |
| 2004/0117785 A1 | 6/2004 | Kincaid | | 2005/0148359 A1 | 7/2005 | Joeressen |
| 2004/0123188 A1 | 6/2004 | Srinivasan et al. | | 2005/0153741 A1 | 7/2005 | Chen et al. |
| 2004/0123270 A1 | 6/2004 | Zhuang et al. | | 2005/0160195 A1 | 7/2005 | Bruner et al. |
| 2004/0123282 A1 | 6/2004 | Rao | | 2005/0170863 A1 | 8/2005 | Shostak |
| 2004/0126803 A1 | 7/2004 | Cash et al. | | 2005/0172117 A1 | 8/2005 | Aura |
| 2004/0133887 A1 | 7/2004 | Herle et al. | | 2005/0172141 A1 | 8/2005 | Gayde et al. |
| 2004/0143573 A1 | 7/2004 | Burkey et al. | | 2005/0182697 A1 | 8/2005 | Rao |
| 2004/0143836 A1 | 7/2004 | McCormack et al. | | 2005/0198062 A1 | 9/2005 | Shapiro |
| 2004/0148379 A1 | 7/2004 | Ogura | | 2005/0198379 A1 | 9/2005 | Panasyuk et al. |
| 2004/0150519 A1 | 8/2004 | Husain et al. | | 2005/0204068 A1 | 9/2005 | Zhu et al. |
| 2004/0152455 A1 | 8/2004 | Herle et al. | | 2005/0204353 A1 | 9/2005 | Ji |
| 2004/0153327 A1 | 8/2004 | Liu et al. | | 2005/0216902 A1 | 9/2005 | Schaefer |
| 2004/0153356 A1 | 8/2004 | Lockwood et al. | | 2005/0216903 A1 | 9/2005 | Schaefer |
| 2004/0158583 A1 | 8/2004 | Kaappa | | 2005/0220079 A1 | 10/2005 | Asokan |
| 2004/0158829 A1 | 8/2004 | Beresin et al. | | 2005/0227677 A1 | 10/2005 | Kallio |
| 2004/0166839 A1 | 8/2004 | Okkonen et al. | | 2005/0227683 A1 | 10/2005 | Draluk et al. |
| 2004/0168165 A1 | 8/2004 | Kokkinen | | 2005/0228847 A1 | 10/2005 | Hayes, Jr. |
| 2004/0174264 A1 | 9/2004 | Reisman et al. | | 2005/0228874 A1 | 10/2005 | Edgett et al. |
| 2004/0190693 A1 | 9/2004 | Beiermeister | | 2005/0233733 A1 | 10/2005 | Roundtree et al. |
| 2004/0192280 A1 | 9/2004 | Dalton et al. | | 2005/0234967 A1 | 10/2005 | Draluk et al. |
| 2004/0192299 A1 | 9/2004 | Wilson et al. | | 2005/0239447 A1 | 10/2005 | Holzman et al. |
| 2004/0192306 A1 | 9/2004 | Elkarat et al. | | 2005/0246703 A1 | 11/2005 | Ahonen |
| 2004/0194081 A1 | 9/2004 | Qumei et al. | | 2005/0251848 A1 | 11/2005 | Al-Janabi |
| 2004/0198447 A1 | 10/2004 | Larsson | | 2005/0257214 A1 | 11/2005 | Moshir et al. |
| 2004/0204117 A1 | 10/2004 | Weiner | | 2005/0264404 A1 | 11/2005 | Franczyk et al. |
| 2004/0208182 A1 | 10/2004 | Boles et al. | | 2005/0268296 A1 | 12/2005 | Marolia et al. |
| 2004/0215702 A1 | 10/2004 | Hamasaki et al. | | 2005/0272455 A1 | 12/2005 | Oommen |
| 2004/0215755 A1 | 10/2004 | O'Neill | | 2005/0278399 A1 | 12/2005 | Herle et al. |
| 2004/0215830 A1 | 10/2004 | Shenfield | | 2005/0278715 A1 | 12/2005 | Herle et al. |
| 2004/0224679 A1 | 11/2004 | Okoro et al. | | 2005/0282533 A1 | 12/2005 | Draluk et al. |
| 2004/0226008 A1 | 11/2004 | Jacobi et al. | | 2006/0007901 A1 | 1/2006 | Roskowski et al. |
| 2004/0229684 A1 | 11/2004 | Blackburn et al. | | 2006/0010437 A1 | 1/2006 | Marolia |
| 2004/0237081 A1 | 11/2004 | Homiller | | 2006/0015626 A1 | 1/2006 | Hallamaa et al. |
| 2004/0239975 A1 | 12/2004 | Kawaura et al. | | 2006/0015860 A1 | 1/2006 | Liu et al. |
| 2004/0242286 A1 | 12/2004 | Benco et al. | | 2006/0020947 A1 | 1/2006 | Hallamaa et al. |
| 2004/0243991 A1 | 12/2004 | Gustafson et al. | | 2006/0026228 A1 | 2/2006 | Kim |
| 2004/0243992 A1 | 12/2004 | Gustafson et al. | | 2006/0031449 A1 | 2/2006 | Hallamaa et al. |
| 2004/0243993 A1 | 12/2004 | Okonnen et al. | | 2006/0036493 A1 | 2/2006 | Aufricht et al. |
| 2004/0244008 A1 | 12/2004 | Lee | | 2006/0036874 A1 | 2/2006 | Cockerille et al. |
| 2004/0250245 A1 | 12/2004 | Rao et al. | | 2006/0036941 A1 | 2/2006 | Neil |
| 2004/0255291 A1 | 12/2004 | Sierer et al. | | 2006/0039313 A1 | 2/2006 | Chou et al. |
| 2004/0257208 A1 | 12/2004 | Huang et al. | | 2006/0039561 A1 | 2/2006 | Ypya et al. |

| | | |
|---|---|---|
| 2006/0052089 A1 | 3/2006 | Khurana et al. |
| 2006/0053066 A1 | 3/2006 | Sherr et al. |
| 2006/0059481 A1 | 3/2006 | Smith et al. |
| 2006/0068786 A1 | 3/2006 | Florence |
| 2006/0072847 A1 | 4/2006 | Chor et al. |
| 2006/0079224 A1 | 4/2006 | Welnick et al. |
| 2006/0080635 A1 | 4/2006 | Anwar et al. |
| 2006/0080650 A1 | 4/2006 | Winters et al. |
| 2006/0080659 A1 | 4/2006 | Ganji |
| 2006/0080681 A1 | 4/2006 | Anwar et al. |
| 2006/0087982 A1 | 4/2006 | Kuure et al. |
| 2006/0089999 A1 | 4/2006 | Xiang et al. |
| 2006/0101040 A1 | 5/2006 | Ren et al. |
| 2006/0106806 A1 | 5/2006 | Sperling et al. |
| 2006/0129414 A1 | 6/2006 | Hallamaa et al. |
| 2006/0130046 A1 | 6/2006 | O'Neill |
| 2006/0158510 A1 | 7/2006 | Lia et al. |
| 2006/0160533 A1 | 7/2006 | Chou et al. |
| 2006/0161599 A1 | 7/2006 | Rosen |
| 2006/0173976 A1 | 8/2006 | Vincent et al. |
| 2006/0174242 A1 | 8/2006 | Zhu et al. |
| 2006/0176397 A1 | 8/2006 | Panabaker |
| 2006/0181553 A1 | 8/2006 | Choe et al. |
| 2006/0190608 A1 | 8/2006 | Sahinoja et al. |
| 2006/0193337 A1 | 8/2006 | Paila et al. |
| 2006/0200658 A1 | 9/2006 | Penkethman |
| 2006/0200814 A1 | 9/2006 | Kontinen et al. |
| 2006/0203722 A1 | 9/2006 | Oommen |
| 2006/0203738 A1 | 9/2006 | Fok et al. |
| 2006/0212561 A1 | 9/2006 | Feng |
| 2006/0212937 A1 | 9/2006 | Natarajan |
| 2006/0217111 A1 | 9/2006 | Marolia et al. |
| 2006/0223528 A1 | 10/2006 | Smith |
| 2006/0224712 A1 | 10/2006 | Aho |
| 2006/0236325 A1 | 10/2006 | Rao et al. |
| 2006/0242305 A1 | 10/2006 | Alnas |
| 2006/0246922 A1 | 11/2006 | Gasbarro et al. |
| 2006/0248172 A1 | 11/2006 | Zurawka et al. |
| 2006/0258344 A1 | 11/2006 | Chen |
| 2006/0271659 A1 | 11/2006 | Mittal et al. |
| 2006/0277590 A1 | 12/2006 | Limont et al. |
| 2007/0014243 A1 | 1/2007 | Meyer et al. |
| 2007/0028226 A1 | 2/2007 | Chen et al. |
| 2007/0036294 A1 | 2/2007 | Chaudhuri et al. |
| 2007/0041545 A1 | 2/2007 | Gainsboro |
| 2007/0043849 A1 | 2/2007 | Lill et al. |
| 2007/0049265 A1 | 3/2007 | Kaimal et al. |
| 2007/0093243 A1 | 4/2007 | Kapadekar et al. |
| 2007/0106806 A1 | 5/2007 | Tu et al. |
| 2007/0132774 A1 | 6/2007 | Fan et al. |
| 2007/0133484 A1 | 6/2007 | Albal et al. |
| 2007/0150444 A1 | 6/2007 | Chesnais et al. |
| 2007/0150524 A1 | 6/2007 | Eker et al. |
| 2007/0169073 A1 | 7/2007 | O'Neill et al. |
| 2007/0169075 A1 | 7/2007 | Lill et al. |
| 2007/0169089 A1 | 7/2007 | Bantz et al. |
| 2007/0169099 A1 | 7/2007 | Rao et al. |
| 2007/0186108 A1 | 8/2007 | Passarella et al. |
| 2007/0190939 A1 | 8/2007 | Abel |
| 2007/0192158 A1 | 8/2007 | Kim |
| 2007/0192453 A1 | 8/2007 | Copeland et al. |
| 2007/0200713 A1 | 8/2007 | Weber et al. |
| 2007/0220504 A1 | 9/2007 | Eker |
| 2007/0226805 A1 | 9/2007 | Jeal et al. |
| 2007/0259633 A1 | 11/2007 | Rao |
| 2007/0277169 A1 | 11/2007 | Rao et al. |
| 2007/0282621 A1 | 12/2007 | Altman et al. |
| 2007/0283003 A1 | 12/2007 | Broyles et al. |
| 2007/0294684 A1 | 12/2007 | Kumashiro et al. |
| 2008/0032763 A1 | 2/2008 | Giobbi |
| 2008/0043726 A1 | 2/2008 | Herrero-Veron et al. |
| 2008/0046583 A1 | 2/2008 | Rao |
| 2008/0062900 A1 | 3/2008 | Rao |
| 2008/0062926 A1 | 3/2008 | Oba |
| 2008/0108321 A1 | 5/2008 | Taaghol et al. |
| 2008/0127320 A1 | 5/2008 | De Lutiis et al. |
| 2008/0144590 A1 | 6/2008 | Rantanen et al. |
| 2008/0154633 A1 | 6/2008 | Ishibashi et al. |
| 2008/0160983 A1 | 7/2008 | Poplett et al. |
| 2008/0196019 A1 | 8/2008 | Meller et al. |
| 2008/0205419 A1 | 8/2008 | Shin et al. |
| 2008/0208928 A1 | 8/2008 | Hernandez |
| 2008/0244049 A1 | 10/2008 | Normark et al. |
| 2008/0271023 A1 | 10/2008 | Bone et al. |
| 2009/0030965 A1 | 1/2009 | Hayes, Jr. |
| 2009/0064341 A1 | 3/2009 | Hartung et al. |
| 2009/0113386 A1 | 4/2009 | Eker et al. |
| 2009/0190757 A1 | 7/2009 | Chen et al. |
| 2009/0204845 A1 | 8/2009 | Herscovitz et al. |
| 2009/0219848 A1 | 9/2009 | Lohmar et al. |
| 2009/0328099 A1 | 12/2009 | Praden et al. |
| 2010/0185727 A1 | 7/2010 | Mittal |
| 2010/0275010 A1 | 10/2010 | Ghirardi |
| 2010/0279733 A1 | 11/2010 | Karsten et al. |
| 2010/0287308 A1 | 11/2010 | Robbin et al. |
| 2011/0022948 A1 | 1/2011 | Brown et al. |
| 2011/0209055 A1 | 8/2011 | Plestid et al. |

FOREIGN PATENT DOCUMENTS

| | | |
|---|---|---|
| CN | 1864429 | 11/2006 |
| CN | 1906574 | 1/2007 |
| CN | 101043372 | 9/2007 |
| CN | 101543016 | 9/2009 |
| CN | 101595469 | 12/2009 |
| CN | 101904105 | 12/2010 |
| DE | 10115729 | 10/2001 |
| DE | 112007002863 | 10/2009 |
| DE | 112008002767 | 10/2010 |
| EP | 0717353 | 6/1996 |
| EP | 0803812 | 10/1997 |
| EP | 0811942 | 12/1997 |
| EP | 1049346 | 11/2000 |
| EP | 1052571 | 11/2000 |
| EP | 1077407 | 2/2001 |
| EP | 1152338 | 11/2001 |
| EP | 1176840 | 1/2002 |
| EP | 1184785 | 3/2002 |
| EP | 1256865 | 11/2002 |
| EP | 1333375 | 6/2003 |
| EP | 1331833 | 7/2003 |
| EP | 1584005 | 7/2004 |
| EP | 1597668 | 8/2004 |
| EP | 1654640 | 12/2004 |
| EP | 1639435 | 1/2005 |
| EP | 1652100 | 1/2005 |
| EP | 1652075 | 2/2005 |
| EP | 1513317 | 3/2005 |
| EP | 1515571 | 3/2005 |
| EP | 1519600 | 3/2005 |
| EP | 1660996 | 3/2005 |
| EP | 1665041 | 4/2005 |
| EP | 1668951 | 6/2005 |
| EP | 1563436 | 8/2005 |
| EP | 1584016 | 10/2005 |
| EP | 1691282 | 8/2006 |
| EP | 1705832 | 9/2006 |
| EP | 1732037 | 12/2006 |
| EP | 2024850 | 2/2009 |
| EP | 2025095 | 2/2009 |
| EP | 2047420 | 4/2009 |
| EP | 2087644 | 8/2009 |
| EP | 2104992 | 9/2009 |
| EP | 1614034 | 1/2012 |
| GB | 2426151 | 11/2006 |
| GB | 2458047 | 9/2009 |
| GB | 2468225 | 9/2010 |
| JP | 61173360 | 8/1986 |
| JP | 07160490 | 6/1995 |
| JP | 07219780 | 8/1995 |
| JP | 08202626 | 8/1996 |
| JP | 8202626 | 8/1996 |
| JP | 11003223 | 1/1999 |
| JP | 11161479 | 6/1999 |
| JP | 11272454 | 10/1999 |
| JP | 11345127 | 12/1999 |
| JP | 2001233353 | 2/2003 |
| KR | 19990050594 | 11/1999 |
| KR | 2002-0034228 | 5/2000 |

| | | |
|---|---|---|
| KR | 20010046714 | 6/2001 |
| KR | 20010076555 | 8/2001 |
| KR | 2001-0100328 | 11/2001 |
| KR | 20010100328 | 11/2001 |
| KR | 20020034228 | 5/2002 |
| KR | 100506785 | 8/2005 |
| KR | 1020050088193 | 9/2005 |
| KR | 1020080008425 | 3/2006 |
| KR | 1020060064660 | 6/2006 |
| KR | 1020060064663 | 6/2006 |
| KR | 1020060089229 | 8/2006 |
| KR | 20090035044 | 4/2009 |
| KR | 100986487 | 10/2010 |
| KR | 101085987 | 11/2011 |
| TW | 090107418 | 1/2003 |
| WO | WO9632679 | 10/1996 |
| WO | WO9838823 | 9/1998 |
| WO | WO9856149 | 12/1998 |
| WO | WO9921382 | 4/1999 |
| WO | WO9957900 | 11/1999 |
| WO | WO0001187 | 1/2000 |
| WO | WO0002358 | 1/2000 |
| WO | WO0022860 | 4/2000 |
| WO | WO0106798 | 1/2001 |
| WO | WO0186985 | 11/2001 |
| WO | WO0223925 | 3/2002 |
| WO | WO0225438 | 3/2002 |
| WO | WO0241147 | 5/2002 |
| WO | WO03010656 | 2/2003 |
| WO | WO03012574 | 2/2003 |
| WO | WO03025742 | 3/2003 |
| WO | WO03034765 | 4/2003 |
| WO | WO03049381 | 6/2003 |
| WO | WO2004031889 | 4/2004 |
| WO | WO2004038546 | 5/2004 |
| WO | WO2004042538 | 5/2004 |
| WO | WO2004049104 | 6/2004 |
| WO | WO2004049115 | 6/2004 |
| WO | WO2004049314 | 6/2004 |
| WO | WO2004059956 | 7/2004 |
| WO | WO2004061551 | 7/2004 |
| WO | WO2004061615 | 7/2004 |
| WO | WO2004063899 | 7/2004 |
| WO | WO2004066091 | 8/2004 |
| WO | WO2004070571 | 8/2004 |
| WO | WO2004072773 | 8/2004 |
| WO | WO2004086196 | 10/2004 |
| WO | WO2004095457 | 11/2004 |
| WO | WO2004109510 | 12/2004 |
| WO | WO2005001665 | 1/2005 |
| WO | WO2005004395 | 1/2005 |
| WO | WO2005008940 | 1/2005 |
| WO | WO2005013123 | 2/2005 |
| WO | WO2005015343 | 2/2005 |
| WO | WO2005024628 | 3/2005 |
| WO | WO2005031570 | 4/2005 |
| WO | WO2005036916 | 4/2005 |
| WO | WO2005041459 | 5/2005 |
| WO | WO2005079334 | 9/2005 |
| WO | WO2006003254 | 1/2006 |
| WO | WO2007112108 | 10/2007 |
| WO | WO2007117514 | 10/2007 |
| WO | WO2007146710 | 12/2007 |
| WO | WO2008003081 | 1/2008 |
| WO | WO2008008880 | 1/2008 |
| WO | WO2008014454 | 1/2008 |
| WO | WO2008022195 | 2/2008 |
| WO | WO2008022198 | 2/2008 |
| WO | WO2008028072 | 3/2008 |
| WO | WO2008033962 | 3/2008 |
| WO | WO2008045700 | 4/2008 |
| WO | WO2008048905 | 4/2008 |
| WO | WO2008067446 | 6/2008 |
| WO | WO2009051760 | 4/2009 |

OTHER PUBLICATIONS

Riel, "Object-Oriented Design Heuristics", Apr. 30, 1996, Addison-Wesley Professional, section 10.1.*

W. J. Meyers. 1980. Design of a microcode link editor. In Proceedings of the 13th annual workshop on Microprogramming (Micro 13). IEEE Press, Piscataway, NJ, USA, 165-170.*

"ILOG Delivers Enterprise-Wide Business Rule Management With ILOG JRules 4.5", Jun. 10, 2003, Press Release, Archived Aug. 4, 2003 at http://web.archive.org/web/20030804140400/http://www.ilog.com/corporate/releases/us/030610_jrules45.cfm.*

Randal C. Burns and Darrell D. E. Long. 1998. In-place reconstruction of delta compressed files. In Proceedings of the seventeenth annual ACM symposium on Principles of distributed computing (PODC '98). ACM, New York, NY, USA, 267-275. D01=10.1145/277697.277747 http://doi.acm.org/10.1145/277697.277747.*

"Focus on OpenView A guide to Hewlett-Packard's Network and Systems Management Platform", Nathan J. Muller, pp. 1-291, CBM Books, published 1995.

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

Bettini, L., "Software Update via Mobile Agent Based Programming," Proc. ACM SAC, Jan. 1, 2002, pp. 32-36.

Bitfone Corp., CA Office Action Jun. 8, 2007, CA App. No. 2,414,281, 4 p.

Bitfone Corp., CN Office Action Jun. 5, 2009, CN App. No. 200610067641.4, 12 p.

Bitfone Corp., CN Office Action Dec. 20, 2010, CN App. No. 200610067641.4, 3 p.

Bitfone Corp., EP Office Action Mar. 16, 10, EP App. No. EP04777313.0, 8 p.

Bitfone Corp., EP Search Report Mar. 22, 2012, EP App. No. 06251423.7, 6 p.

Bitfone Corp., EP Office Action Mar. 26, 2010, EP App. No. 04785381.7, 5 p.

Bitfone Corp., EP Office Action May 11, 2012, EP App. No. 04777313.0, 9 p.

Bitfone Corp., EP Search Report Jan. 18, 2008, EP App No. 04759830.5, 5 p.

Bitfone Corp., EP Search Report Mar. 30, 2011, EP App. No. 06251423.7, 7 p.

Bitfone Corp., EP Search Report Jul. 1, 2011, EP App. No. 06251423.7, 11 p.

Bitfone Corp., EP Search Report Jul. 4, 2006, EP App. No. EP06250739.7, 7 p.

Bitfone Corp., EP Search Report Jul. 19, 2006, EP App. No. 06251512.7, 8 p.

Bitfone Corp., EP Search Report Nov. 26, 2009, EP App. No. EP04777313.0, 3 p.

Bitfone Corp., Int'l Prelim Rpt Jan. 9, 2006, PCT App. No. PCT/US2004/022598, 7 p.

Bitfone Corp:, Int'l Prelim Rpt Jan. 30, 2006, PCT App. No. PCT/US2004/024876, 8 p.

Bitfone Corp., Int'l Prelim Rpt Mar. 6, 2006, PCT App. No. PCT/US2004/028433, 8 p.

Bitfone Corp., Int'l Prelim Rpt Mar. 13, 2006, PCT App. No. PCT/US2004/021037, 7 p.

Bitfone Corp., Int'l Prelim Rpt Mar. 27, 2006, PCT App. No. PCT/US2004/031547, 9 p.

Bitfone Corp., Int'l Prelim Rpt Aug. 5, 2005, PCT App No. PCT/US2004/002950, 6 p.

Bitfone Corp., Int'l Prelim Rpt Aug. 12, 2005, PCT App. No. PCT/US2004/002084, 4 p.

Bitfone Corp., Int'l Prelim Rpt Sep. 30, 2008, PCT App. No. PCT/US2007/007489, 4 p.

Bitfone Corp., Int'l Prelim Rpt Oct. 1, 2005, PCT App. No. PCT/US2004/008918, 4 p.

Bitfone Corp., Int'l Prelim Rpt Oct. 28, 2008, PCT App. No. PCT/US2004/000694, 4 p.
Bitfone Corp., Int'l Prelim Rpt Nov. 7, 2006, PCT App. No. PCT/US2005/004520, 4 p.
Bitfone Corp., Int'l Prelim Rpt Dec. 8, 2005, PCT App. No. PCT/US2004/017731, 8 p.
Bitfone Corp., Int'l Prelim Rpt Dec. 10, 2008, PCT App. No. PCT/US2007/070534, 9 p.
Bitfone Corp., Int'l Prelim Rpt, Apr. 3, 2006, PCT App. No. PCT/US2004/033071, 9 p.
Bitfone Corp., Int'l Search Report & Written Opinion Jan. 4, 2005, PCT App. No. PCT/US2004/002084, 8 p.
Bitfone Corp., Int'l Search Report & Written Opinion Jan. 14, 2005, PCT App. No. PCT/US2004/011219, 9 p.
Bitfone Corp., Int'l Search Report & Written Opinion Jul. 14, 2008, PCT App. No. PCT/US2004/001574, 16 p.
Bitfone Corp., Int'l Search Report Jan. 10, 2005, PCT App. No. PCT/US2003/033241, 3 p.
Bitfone Corp., Int'l Search Report Jan. 19, 2005, PCT App. No. PCT/US2004/024876, 1 p.
Bitfone Corp., Int'l Search Report Jan. 25, 2005, PCT App. No. PCT/US2003/037265, 3 p.
Bitfone Corp., Int'l Search Report Jan. 25, 2005, PCT App. No. PCT/US2004/033071, 3 p.
Bitfone Corp., Int'l Search Report Jan. 30, 2006, PCT App. No. PCT/US2004/021037, 3 p.
Bitfone Corp., Int'l Search Report Feb. 10, 2005, PCT App. No. PCT/US2004/031547, 3 p.
Bitfone Corp., Int'l Search Report Mar. 7, 2005, PCT App. No. PCT/US2004/002950, 4 p.
Bitfone Corp., Int'l Search Report Mar. 16, 2005, PCT App. No. PCT/US2004/008918, 3 p.
Bitfone Corp., Int'l Search Report Apr. 12, 2008, PCT App. No. PCT/US2004/063899, 3 p.
Bitfone Corp., Int'l Search Report Apr. 22, 2004, PCT App. No. PCT/US2003/027620, 4 p.
Bitfone Corp., Int'l Search Report Apr. 23, 2008, PCT App. No. PCT/US2007/007489, 3 p.
Bitfone Corp., Int'l Search Report May 26, 2005, PCT App. No. PCT/US2004/028433, 7 p.
Bitfone Corp., Int'l Search Report Jun. 22, 2005, PCT App. No. PCT/US2003/041555, 3 p.
Bitfone Corp., Int'l Search Report Jul. 20, 2005, PCT App. No. PCT/US2004/022598, 3 p.
Bitfone Corp., Int'l Search Report Jul. 27, 2005, PCT App No. PCT/US2003/035934, 3 p.
Bitfone Corp., Int'Search Report Aug. 23, 2005, PCT App. No. PCT/US2004/017731, 6 p.
Bitfone Corp., Int'l Search Report Oct. 3, 2006, PCT App. No. PCT/US2005/004520, 3 p.
Bitfone Corp., Int'l Search Report Oct. 3, 2008, PCT App. No. PCT/US2004/000694, 3 p.
Bitfone Corp., Int'l Search Report Oct. 14, 2004, PCT App. No. PCT/U52003/035377, 4 p.
Bitfone Corp., Int'l Search Report Dec. 3, 2004, PCT App. No. PCT/US2003/036995, 4 p.
Bitfone Corp., Int'l Search Report, Jul. 20, 2006, PCT App. No. PCT/US2003/027727, 8 p.
Bitfone Corp., JP Final Office Action Jun. 6, 2006, Jap. App. No. 2002-543291, 10 p.
Bitfone Corp., JP Office Action Nov. 8, 2005, JP App. No. 2002-543291, 13 p.
Bitfone Corp., KR Office Action Feb. 16, 2011, KR App. No. KR-10-2006-7006350, 4 p.
Bitfone Corp., KR Office Action Apr. 10, 2008, KR App. No. KR10-2006-7004343, 7 p.
Bitfone Corp., KR Office Action May 21, 2008, KR App. No. KR10-2006-7004488, 8 p.
Bitfone Corp., KR Office Action Aug. 21, 2007, KR App. No. KR10-2006-7004343, 5 p.
Bitfone Corp., KR Office Action Aug. 21, 2007, KR App. No. KR10-2006-7004488, 5 p.
Bitfone Corp., Written Opinion Jan. 19, 2005, PCT App. No. PCT/US2004/017731, 7 p.
Bitfone Corp., Written Opinion Jan. 30, 2006, PCT App. No. PCT/US2004/021037, 6 p.
Bitfone Corp., Written Opinion Mar. 26, 2006, PCT App. No. PCT/US2004/031547, 8 p.
Bitfone Corp., Written Opinion Jul. 20, 2005, PCT App. No. PCT/US2004/022598, 6 p.
Bitfone Corp., Written Opinion Dec. 4, 2005, PCT App. No. PCT/US2004/017731, 7 p.
Burns et al., "In-Place Reconstruction of Version Differences," IEEE Transactions on Knowledge and Data Engineering, Vo. 15. No. 4, Jul./Aug. 2003, pp. 973-984.
Ciancarini et al., "Using a Coordination Language to Specify and Analyze Systems Containing Modile Components," ACM Transactions, vol. 9. No. 2, Apr. 2000, pp. 167-198.
Claise et al., "IPFIX Protocol Specification", IPFIX Working Group, Jun. 2003, retrieved from: http://tools.ietf.org/html/draft-ietf-ipfix-protocol-00.
CRC Press LLC., "Overview of Cryptography," Copyright 1997 CRC Press LLC, 48 p.
Fasbender et al., "Any Network, Any Terminal, Anywhere," IEEE Personal Communications, Apr. 1999, pp. 22-30, IEEE Press. 1999.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct., 1999.
Hoffmeyer et al., "Radio Software Download for Commercial Wireless Reconfigurable Devices," IEEE Communications Magazine, IEEE Service Center, New York NY, US. vol. 42, No. 3, Mar. 2004, pp. S26-S32.
HPC, Int'l Search Report Sep. 5, 2007, PCT App. No. PCT/US2007/008415, 2 p.
HPDC, CN Office Action Sep. 22, 2011, CN App. No. 200780044370.3, 9 p.
HPDC, EP Office Action Jan. 22, 2010, EP App. No. 04701739.7, 7 p.
HPDC, EP Office Action Feb. 4, 2011, EP App. No. 07843502.1, 4 p.
HPDC, EP Office Action Feb. 9, 2011, EP App. No. 04759830.5, 3 p.
HPDC, EP Office Action Mar. 4, 2011, EP App. No. 07813468.1, 9 p.
HPDC, EP Office Action Mar. 23, 2010, EP App. No. 04705590.0, 10 p.
HPDC, EP Office Action Apr. 3, 2009, EP App. No. 04779823.6, 7 p.
HPDC, EP Office Action Apr. 11, 2008, EP App. No. 04759830.5, 5 p.
HPDC, EP Office Action Apr. 23, 2009, EP App. No. 04701739.7, 7 p.
HPDC, EP Office Action May 4, 2011, EP App. No. 04759830.5, 3 p.
HPDC, EP Office Action May 11, 2010, Ep App. No. 03759224.3, 6 p.
HPDC, EP Office Action Jun. 3, 2009, EP App. No. 01991949.7, 7p.
HPDC, EP Office Action Jun. 30, 2009, EP App. No. 07798184.3, 5 p.
HPDC, EP Office Action Jul. 27, 2011, EP App. No. 07844241.5, 6 p.
HPDC, EP Office Action Aug. 12, 2011, EP App. No. 04759830.5. 56 p.
HPDC, EP Office Action Aug. 30, 2011, EP App. No. 04779823.6, 6 p.
HPDC, EP Office Action Sep. 2, 2010, EP App. No. 04759830.5, 4 p.
HPDC, EP Office Action Sep. 7, 2009, EP App. No. 07844241.5, 3 p.
HPDC, EP Office Action Sep. 18, 2009, EP App. No. 07843502.1, 2 p.
HPDC, EP Office Action Oct. 15, 2009, EP App. No. 04785067.2, 6 p.
HPDC, EP Office Action Oct. 27, 2009, EP App. No. 04782849.6, 3 p.
HPDC, EP Office Action Nov. 10, 2009, EP App. No. 07798184.3, 4 p.
HPDC, EP Supp. Search Report Feb. 6, 2009, EP App. No. 04701739, 3 p.
HPDC, EP Search Report Feb. 23, 2010, EP App. No. 03789910.1, 5 p.

HPDC, EP Search Report Mar. 6, 2009, EP App. No. 01991949.7, 7 p.
HPDC, EP Search Report Jun. 3, 2009, EP App. No. 01991949.7, 7 p.
HPDC, EP Search Report Aug. 9, 2010, EP App. No. 03789910.1, 6 p.
HPDC, EP Search Report Oct. 19, 2009, EP App. No. 07813468.1, 10 p.
HPDC, EP Search Report Nov. 13, 2009, EP App. No. 04756990.0, 4 p.
HPDC, EP Search Report Nov. 24, 2008, EP App. No. 04779823.6, 3 p.
HPDC, EP Search Report Nov. 25, 2009, EP App. No. 04705590.0, 6 p.
HPDC, EP Supp. Search Report Feb. 6, 2009, EP App. No. 004701739.7, 3 p.
HPDC, EP Supp. Search Report Jan. 26, 2010, EP App. No. 03759224.3, 3 p.
HPDC, EP Supp. Search Report Dec. 22, 2009, EP App. No. 03789910.1, 7 p.
HPDC, GB Office Action Feb. 25, 2011, GB App. No. 0910190.8, 6 p.
HPDC, GB Office Action Jul. 26, 2011, GB App. No. 0910190.8, 1 p.
HPDC, GB Office Action Sep. 20, 2011, GB App. No. 1007372.4, 3 p.
HPDC, GB Office Action Dec. 22, 2011, GB App. No. 1007372.4, 2 p.
HPDC, Int'l Prelim Rpt Jan. 6, 2009, PCT App. No. PCT/US2007/072493, 8 p.
HPDC, Int'l Prelim Rpt Jan. 13, 2009, PCT App. No. PCT/US2007/073340, 8 p.
HPDC, Int'l Prelim Rpt Jan. 27, 2009, PCT App. No. PCT/US2007/074586, 5 p.
HPDC, Int'l Prelim Rpt Feb. 17, 2009, PCT App. No. PCT/US2007/076001, 7 p.
HPDC, Int'l Prelim Rpt Feb. 17, 2009, PCT App. No. PCT/US2007/076006, 7 p.
HPDC, Int'l Prelim Rpt Mar. 3, 2009, PCT App. No. PCT/US2007/077288, 7 p.
HPDC, Int'l Prelim Rpt Mar. 17, 2009, PCT App. No. PCT/US2007/078326, 7 p.
HPDC, Int'l Prelim Rpt Apr. 7, 2009, PCT App. No. PCT/US2007/079920, 8 p.
HPDC, Int'l Prelim Rpt Apr. 20, 2010, PCT App. No. PCT/US2008/011824, 6 p.
HPDC, Int'l Prelim Rpt Apr. 22, 2009, PCT App. No. PCT/US2007/081273, 8 p.
HPDC, Int'l Prelim Rpt Jun. 3, 2009, PCT App. No. PCT/US2007/085903, 6 p.
HPDC, Int'l Prelim Rpt Sep. 30, 2008, PCT App. No. PCT/US2007/008415, 7 p.
HPDC, Int'l Search Report Jan. 3, 2008, PCT App. No. US2007/073340, 5 p.
HPDC, Int'l Search Report Jan. 31, 2008, PCT App. No. PCT/US2007/076001, 3 p.
HPDC, Int'l Search Report Feb. 14, 2008, PCT App. No. PCT/US2007/072493, 5 p.
HPDC, Int'l Search Report Mar. 5, 2008, PCT App. No. PCT/US2007/078326, 5 p.
HPDC, Int'l Search Report Mar. 25, 2009, PCT App. No. PCT/US2008/011824, 2p.
HPDC, Int'l Search Report Mar. 27, 2008, PCT App. No. PCT/US2007/079920, 3 p.
HPDC, Int'l Search Report Apr. 10, 2008, PCT App No. PCT/US2007/070534, 7 p.
HPDC, Int'l Search Report Jun. 26, 2008, PCT App. No. PCT/US2007/076006, 5 p.
HPDC, Int'l Search Report Jul. 18, 2008, PCT App. No. PCT/US2007/077288, 5 p.
HPDC, Int'l Search Report Aug 13, 2008, PCT App. No. PCT/US2007/085903, 3 p.
HPDC, Int'l Search Report Sep. 2, 2008, PCT App. No. PCT/US2007/081273, 5 p.
HPDC, Int'l Search Report Oct. 24, 2008, PCT App. No. PCT/US2007/074586, 3 p.
HPDC, JP Office Action Nov. 8, 2005, JP App. No. 2002-543291, 13 p.
HPDC, KR Office Action May 6, 2010, KR App. No. 10-2009-7005363, 3 p.
HPDC, KR Office Action Nov. 11, 2009, KR App. No. 10-2009-7005363, 2 p.
HPDC, Written Opinion Apr. 17, 2010, PCT App. No. PCT/US2008/011824, 4 p.
IBM, "System Firmware Update Method Before Rebooting the Operating System," Research Disclosure, Mason Publications, vol. 425, No. 86, Sep. 1, 1999, 2 p.
Jing et al., "Client Server Computing in Mobile Environments," ACM Computing Surveys, vol. 31, No. 2, Jun. 1999, pp. 117-157.
Jones, F., "Jambala-Intelligence beyond digital wireless," Ericsson Review No. 3, 1998, pp. 126-131.
Klein et al., "Compressed Delta Encoding for LZSS Encoded Files," 2007 Data Compression Conference (DCC'07) IEEE Computer Society, 10 p.
Koenig et al., "Re: ext2—available+used not equal to total," Dec. 31, 1998, accessed on Oct. 9, 2007 from <http://www.uwsg.iu.edu/hypermail/linux/kernel/9901.0/0270.html>, Linux Kernel Archive, 2 p.
Lindholm et al., "Fast and Simple XML Tree Differencing by Sequence Alignment," DocEng '06, Oct. 10-13, 2006, Amsterdam, The Netherlands, Copyright 2006 ACM, pp. 75-84.
Memorymanagement.Org, http://web.archive.org/web/20020313115607/http://www.memorymanagement.org/glossary, 3 p. 2003.
Meng et al., "Schema-Guided Wrapper Maintenance for Web-Data Extraction," WIDM'03, Nov. 7-8, 2003, pp. 1-8.
Microsoft, "Computer Dictionary," Microsoft Press, 2002, pp. 372, 373, 380, 423 and 565.
Oommen, P., "A Framework for Integrated Management of Mobile-Stations Over-the-Air," Integrated Network Management Proceedings, 2001 IEEE/IFIP International Symposium on May 14-18, 2001, pp. 247-256.
Oommen, P., "Over the Air Handset Management," Emerging Technologies Symposium; Broadband, Wireless Internet Access, 2000 IEEE 10-11 Apr. 2000, 4 p.
Open Mobile Alliance, "Device Management Protocol, Candidate," Ver 1.2, Jun. 2, 2006.
Open Mobile Alliance, "Generic Content Download Over the Air Specification," Version 1.0, Sep. 12, 2002, 42 p.
Pant et al., Software Reliability Predictions for Distributed Software, IEEE, 1998, pp. 11-21.
Park et al., "A Low-cost Memory Architecture with NAND XIP for Mobile Embedded Systems," CODES+ISSS'03, Oct. 1-3, 2003, pp. 138-143.
Pedram, M., "Power Optimization and Management in Embedded Systems," Jan. 2001, pp. 239-244.
Peymandoust et al., "Low Power Embedded Software Optimization Using Symbolic Algebra," Mar. 2002, pp. 1-7.
Raskar et al., "Image Fusion for Context Enhancement and Video Surrealism," Proceedings of the Third Int'l. Symposium on Non-Photorealistic Animation and Rendering (NPAR2004), Jun. 7-9, 2004, 9 p.
Satoh et al., Experiment of Component-Based Software Development on Multiple Distributed Object Environments, IEEE, 1998, 8 p.
Sevanto et al., "Introducing Quality-of-Service and Traffic Classes into Wireless Mobile Networks," WOWMOM 98 Dallas, Texas, USA, Copyright ACM 1998 pp. 21-30.
Symborski, C. W., "Updating Softwaare and Configuration Data in a Distributed Communications Nev.'Vork". 1988 Computer NetworKing Symposium, 8 p.
Varshney et al., "Emerging Mobile and Wireless Networks," Communications of the ACM Jun. 2000, vol. 43, No. 6, pp. 73-81.
W3C, XML Signature Syntax and Processing, (2nd edition), Jun. 10, 2008, 1 p. [Online] http://www.w3.org/TR/xmldsig-core/.
White, Ron, "How Computers Work," Millennium Ed., Que Corporation, Indianapolis, IN, 1999, 284 p.

Yergeau, F., "UTF-8, a transformation format of ISO 10646," Jan. 1998, Alis Technologies, 10 p.
Yoshimura et al., "Mobile Streaming Media CDN Enabled by Dynamic SMIL," WWW2003, May 7-11, 2002, Honolulu, Hawaii, ACM, pp. 651-661.
Wheatley, Office Action Dec. 27, 2011, U.S. Appl. No. 12/057,044, Mar. 27, 2008, 6 p.
Rao, Office Action Nov. 14, 2008, U.S. Appl. No. 11/057,361, Feb. 14, 2005, 8 p.
Insun, Office Action Feb. 3, 2010, U.S. Appl. No. 11/111,276, Apr. 21, 2005, 10 p.
Insun, Office Action Jul. 12, 2010, U.S. Appl. No. 11/111,276, Apr. 21, 2005, 11 p.
Iyad, Office Action Jan. 28, 2008, U.S. Appl. No. 11/100,305, Apr. 6, 2005, 20 p.
Iyad, Final Office Action Jul. 22, 2008, U.S. Appl. No. 11/100,305, Apr. 6, 2005, 11 p.
Iyad, Office Action Jan. 21, 2009, U.S. Appl. No. 11/100,305, Apr. 6, 2005, 7 p.
Iyad, Final Office Action Jul. 8, 2009, U.S. Appl. No. 11/100,305, Apr. 6, 2005, 25 p.
Shao-Chun, Office Action Dec. 11, 2008, U.S. Appl. No. 11/120,556, May 3, 2005, 28 p.
Shao-Chun, Final Office Action May 26, 2009, U.S. Appl. No. 11/120,556, May 3, 2005, 30 p.
Shao-Chun, Office Action Oct. 28, 2009, U.S. Appl. No. 11/120,556, May 3, 2005, 31 p.
Shao-Chun, Final Office Action May 13, 2010, U.S. Appl. No. 11/120,556, May 3, 2005 32 p.
Shao-Chun, Office Action Nov. 29, 2010, U.S. Appl. No. 11/120,556, May 3, 2005, 26 p.
Shao-Chun, Office Action Oct. 29, 2008, U.S. Appl. No. 11/124,866, May 9, 2005, 13 p.
Shao-Chun, Office Action May 5, 2009, U.S. Appl. No. 11/124,866, May 9, 2005, 14 p.
Shao-Chun, Office Action Nov. 12, 2008, U.S. Appl. No. 11/144,537, Jun. 3, 2005, 16 p.
Shao-Chun, Final Office Action Apr. 29, 2009, U.S. Appl. No. 11/144,537, Jun. 3, 2005, 22 p.
Sunil, Office Action Aug. 20, 2008, U.S. Appl. No. 11/189,344, Jul. 26, 2005, 12 p.
Sunil, Final Office Action Feb. 19, 2009, U.S. Appl. No. 11/189,344, Jul. 26, 2005, 13 p.
Sunil, Office Action Aug. 19, 2009, U.S. Appl. No. 11/189,344, Jul. 26, 2005, 10 p.
Sunil, Office Action Sep. 4, 2008, U.S. Appl. No. 11/226,032, Sep. 14, 2005, 17 p.
Sunil, Final Office Action Jul. 6, 2009, U.S. Appl. No. 11/226,032, Sep. 14, 2005, 17 p.
Sunil, Office Action Dec. 14, 2009, U.S. Appl. No. 11/226,032, Sep. 14, 2005, 23 p.
Sunil, Final Office Action Apr. 29, 2010, U.S. Appl. No. 11/226,032, Sep. 14, 2005, 16 p.
Rao, Office Action Aug. 21, 2009, U.S. Appl. No. 11/247,463, Oct. 11, 2005, 18 p.
Rao, Final Office Action Jul. 13, 2010, U.S. Appl. No. 11/247,463, Oct. 11, 2005, 19 p.
Rao, Office Action Mar. 8, 2011, U.S. Appl. No. 11/247,463, Oct. 11, 2005, 20 p.
Rao, Final Office Action Aug. 30, 2011, U.S. Appl. No. 11/247,463, Oct. 11, 2005, 20 p.
Shao-Chun, Office Action Jul. 8, 2009, U.S. Appl. No. 11/316,291, Dec. 21, 2005, 18 p.
Shao-Chun, Final Office Action Dec. 2, 2009, U.S. Appl. No. 11/316,291, Dec. 21, 2005, 18 p.
Giovanni, Office Action Jul. 8, 2009, U.S. Appl. No. 11/316,292, Dec. 21, 2005, 8 p.
Giovanni, Office Action Jan. 25, 2010, U.S. Appl. No. 11/316,292, Dec. 21, 2005, 7 p.
Shao-Chun, Office Action May 27, 2009, U.S. Appl. No. 11/352,813, Feb. 13, 2006, 31 p.
Sunil, Office Action Jun. 10, 2008, U.S. Appl. No. 11/352,702, Feb. 13, 2006, 8 p.
Sunil, Final Office Action Mar. 30, 2009, U.S. Appl. No. 11/352,702, Feb. 13, 2006, 11 p.
Sunil, Office Action Sep. 28, 2009, U.S. Appl. No. 11/352,702, Feb. 13, 2006, 9 p.
Sunil, Final Office Action Mar. 16, 2010, U.S. Appl. No. 11/352,702, Feb. 13, 2006, 11 p.
Rao, Office Action Feb. 17, 2009, U.S. Appl. No. 11/374,481, Mar. 9, 2006, 17 p.
Rao, Final Office Action Jul. 21, 2009, U.S. Appl. No. 11/374,481, Mar. 9, 2006, 18 p.
Rao, Office Action Jan. 4, 2010, U.S. Appl. No. 11/374,481, Mar. 9, 2006, 10 p.
Jason, Office Action Oct. 16, 2008, U.S. Appl. No. 11/369,561, Mar. 7, 2006, 13 p.
Jason, Final Office Action May 8, 2009, U.S. Appl. No. 11/369,561, Mar. 7, 2006, 14 p.
Rao, Office Action Mar. 12, 2009, U.S. Appl. No. 11/385,162, Mar. 21, 2006, 6 p.
Rao, Office Action Sep. 25, 2009, U.S. Appl. No. 11/385,162, Mar. 21, 2006, 8 p.
Rao, Final Office Action May 4, 2010, U.S. Appl. No. 11/385,162, Mar. 21, 2006, 8 p.
Sunil, Office Action Nov. 13, 2008, U.S. Appl. No. 11/189,944, Jul. 26, 2005, 19 p.
Sunil, Final Office Action Apr. 27, 2009, U.S. Appl. No. 11/189,944, Jul. 26, 2005, 21 p.
Glenn, Office Action May 29, 2009, U.S. Appl. No. 11/478,108, Jun. 28, 2006, 19 p.
Glenn, Office Action Dec. 18, 2009, U.S. Appl. No. 11/478,108, Jun. 28, 2006, 17 p.
Glenn, Final Office Action Apr. 27, 2010, U.S. Appl. No. 11/478,108, Jun. 28, 2006, 17 p.
Glenn, Office Action Sep. 2, 2010, U.S. Appl. No. 11/478,108, Jun. 28, 2006, 21 p.
Glenn, Office Action Dec. 29, 2010, U.S. Appl. No. 11/478,108, Jun. 28, 2006, 16 p.
Rao, Office Action Apr. 6, 2010, U.S. Appl. No. 11/397,187, Apr. 4, 2006, 12 p.
Giovanni, Office Action May 26, 2010, U.S. Appl. No. 11/500,754, Aug. 7, 2006, 12 p.
Giovanni, Final Office Action Sep. 2, 2010, U.S. Appl. No. 11/500,754, Aug. 7, 2006, 17 p.
Uma, Office Action Oct. 6, 2009, U.S. Appl. No. 11/707,505, Feb. 16, 2007, 16 p.
Uma, Final Office Action Mar. 8, 2010, U.S. Appl. No. 11/707,505, Feb. 16, 2007 17 p.
Uma, Office Action Dec. 10, 2010, U.S. Appl. No. 11/707,505, Feb. 16, 2007 12 p.
Sunil, Office Action Oct. 7, 2010, U.S. Appl. No. 11/824,344, Jun. 29, 2007, 7 p.
Marko, Office Action Apr. 6, 2009, U.S. Appl. No. 11/732,267, Apr. 2, 2007, 23 p.
Marko, Final Office Action Oct. 19, 2009, U.S. Appl. No. 11/732,267, Apr. 2, 2007, 10 p.
Rao, Office Action Oct. 19, 2009, U.S. Appl. No. 11/799,586, May 2, 2007, 18 p.
Rao, Final Office Action Mar. 8, 2010, U.S. Appl. No. 11/799,586, May 2, 2007, 18 p.
Rao, Office Action Aug. 18, 2010, U.S. Appl. No. 11/799,586, May 2, 2007, 19 p.
Rao, Office Action Mar. 21, 2008, U.S. Appl. No. 11/728,517, Mar. 26, 2007, 17 p.
Rao, Office Action Oct. 20, 2008, U.S. Appl. No. 11/728,517, Mar. 26, 2007, 21 p.
Rao, Office Action Apr. 13, 2009, U.S. Appl. No. 11/728,517, Mar. 26, 2007, 23 p.
Rao, Office Action Dec. 3, 2009, U.S. Appl. No. 11/728,517, Mar. 26, 2007, 19 p.
Rao, Final Office Action Jun. 24, 1970, U.S. Appl. No. 11/728,517, Mar. 26, 2007, 25 p.
Marolia, Office Action Jul. 28, 2009, U.S. Appl. No. 11/827,583, Jul. 12, 2007, 18 p.

Rao, Office Action Jun. 16, 2009, U.S. Appl. No. 11/839,143, Aug. 15, 2007, 11 p.
Rao, Final Office Action Jan. 8, 2010, U.S. Appl. No. 11/839,143, Aug. 15, 2007, 15 p.
Rao, Office Action Aug. 4, 2010, U.S. Appl. No. 11/839,143, Aug. 15, 2007, 16 p.
Rao, Final Office Action Oct. 5, 2011, U.S. Appl. No. 11/839,143, Aug. 15, 2007, 20 p.
Rao, Office Action May 13, 2011, U.S. Appl. No. 11/839,143, Aug. 15, 2007, 17 p.
Rao, Final Office Action Aug. 23, 2011, U.S. Appl. No. 11/839,143, Aug. 15, 2007, 17 p.
Rao, Office Action Sep. 17, 2009, U.S. Appl. No. 11/847,658, Aug. 30, 2007, 10 p.
Rao, Office Action Mar. 25, 2010, U.S. Appl. No. 11/847,658, Aug. 30, 2007, 11 p.
Rao, Office Action Aug. 25, 2010, U.S. Appl. No. 11/847,658, Aug. 30, 2007, 13 p.
Rao, Office Action Nov. 18, 2010, U.S. Appl. No. 11/847,658, Aug. 30, 2007, 11 p.
Rao, Office Action Aug. 24, 2010, U.S. Appl. No. 11/854,414, Sep. 12, 2007, 14 p.
Rao, Office Action Nov. 17, 2009, U.S. Appl. No. 11/947,322, Nov. 29, 2007, 15 p.
Rao, Final Office Action May 14, 2010, U.S. Appl. No. 11/947,322, Nov. 29, 2007, 22 p.
Rao, Office Action Dec. 27, 2010, U.S. Appl. No. 11/947,322, Nov. 29, 2007, 43 p.
Rao, Final Office Action May 26, 2011, U.S. Appl. No. 11/947,322, Nov. 29, 2007, 40 p.
Rao, Office Action Jan. 9, 2012, U.S. Appl. No. 11/947,322, Nov. 29, 2007, 40 p.
Brunet, Office Action Jan. 25, 2006, U.S. Appl. No. 10/822,092, Apr. 9, 2004, 14 p.
Brunet, Final Office Action Aug. 23, 2006, U.S. Appl. No. 10/822,092, Apr. 9, 2004, 13 p.
Brunet, Office Action Feb. 22, 2007, U.S. Appl. No. 10/822,092, Apr. 4, 2004, 19 p.
Brunet, Final Office Action Nov. 15, 2007, U.S. Appl. No. 10/822,092, Apr. 9, 2004, 22 p.
Brunet, Office Action Apr. 4, 2008, U.S. Appl. No. 10/822,092, Apr. 9, 2004, 27 p.
Brunet, Final Office Action Sep. 23, 2008, U.S. Appl. No. 10/822,092, Apr. 9, 2004, 28 p.
Brunet, Office Action Mar. 8, 2007, U.S. Appl. No. 10/889,693, Jul. 12, 2004, 17 p.
Brunet, Final Office Action Nov. 28, 2007, U.S. Appl. No. 10/889,693, Jul. 12, 2004, 19 p.
Brunet, Office Action Jun. 25, 2008, U.S. Appl. No. 10/889,693, Jul. 12, 2004, 69 p.
Brunet, Final Office Action Dec. 23, 2008, U.S. Appl. No. 10/889,693, Jul. 12, 2004, 23 p.
Brunet, Office Action Jun. 29, 2006, U.S. Appl. No. 10/999,606, Nov. 29, 2004, 9 p.
Brunet, Final Office Action Mar. 7, 2007, U.S. Appl. No. 10/999,606, Nov. 29, 2004, 10 p.
Brunet, Office Action Apr. 18, 2008, U.S. Appl. No. 10/999,606, Nov. 29, 2004, 6 p.
Brunet, Office Action Apr. 24, 2009, U.S. Appl. No. 10/999,606, Nov. 29, 2004, 12 p.
Brunet, Final Office Action Aug. 20, 2009, U.S. Appl. No. 10/999,606, Nov. 29, 2004, 16 p.
Brunet, Office Action Nov. 10, 2009, U.S. Appl. No. 10/999,606, Nov. 29, 2004, 16 p.
Brunet, Final Office Action Feb. 18, 2010, U.S. Appl. No. 10/999,606, Nov. 29, 2004, 16 p.
Shao-Chun, Office Action Jun. 6, 2007, U.S. Appl. No. 11/125,974, May 9, 2005, 9 p.
Shao-Chun, Office Action Jan. 17, 2008, U.S. Appl. No. 11/125,974, May 9, 2005, 9 p.
Shao-Chun, Final Office Action Aug. 18, 2008, U.S. Appl. No. 11/125,974, May 9, 2005, 13 p.
Jeffrey, Office Action Jul. 26, 2006, U.S. Appl. No. 11/247,459, Oct. 11, 2005, 9 p.
Jeffrey, Office Action May 15, 2007, U.S. Appl. No. 11/247,459, Oct. 11, 2005, 10 p.
Jeffrey, Office Action Oct. 31, 2007, U.S. Appl. No. 11/247,459, Oct. 11, 2005, 26 p.
O'Neill, Office Action Aug. 25, 2006, U.S. Appl. No. 10/311,462, May 13, 2003, 24 p.
O'Neill, Office Action Mar. 5, 2010, U.S. Appl. No. 10/311,462, May 13, 2003, 23 p.
O'Neill, Final Office Action Jul. 23, 2010, U.S. Appl. No. 10/311,462, May 13, 2003, 24 p.
O'Neill, Office Action Nov. 18, 2009, U.S. Appl. No. 11/335,312, Jan. 19, 2006, 12 p.
O'Neill, Office Action Mar. 12, 2004, U.S. Appl. No. 10/404,601, Apr. 1, 2003, 28 p.
Shao-Chun, Final Office Action Jul. 25, 2006, U.S. Appl. No. 10/411,784, Apr. 11, 2003, 22 p.
Shao-Chun, Office Action Mar. 27, 2007, U.S. Appl. No. 10/411,784, Apr. 11, 2003, 16 p.
Shao-Chun, Final Office Action Oct. 18, 2007, U.S. Appl. No. 10/411,784, Apr. 11, 2003, 15 p.
Rao, Examiner's Answer Dec. 6, 2011, U.S. Appl. No. 11/427,635, Jan. 24, 2005, 19 p.
Rao, Final Office Action Jun. 10, 2011, U.S. Appl. No. 11/427,635, Jan. 24, 2005, 18 p.
Rao, Office Action Dec. 27, 2010, U.S. Appl. No. 11/427,635 Jan. 24, 2005, 13 p.
Rao, Office Action Mar. 31, 2010, U.S. Appl. No. 11/427,635 Jan. 24, 2005, 14 p.
Rao, Office Action Oct. 15, 2009, U.S. Appl. No. 11/427,635, Jan. 24, 2005, 11 p.
Rao, Final Office Action Apr. 30, 2009, U.S. Appl. No. 11/427,635, Jan. 24, 2005, 13 p.
Rao, Office Action Nov. 26, 2008, U.S. Appl. No. 11/427,635, Jan. 24, 2005, 15 p.
Rao, Examiner's Answer Mar. 16, 2011, U.S. Appl. No. 11/043,813, Jan. 26, 2005, 16 p.
Rao, Final Office Action Aug. 20, 2010, U.S. Appl. No. 11/043,813, Jan. 26, 2005, 16 p.
Rao, Office Action Mar. 9, 2010, U.S. Appl. No. 11/043,813, Jan. 26, 2005, 14 p.
Rao, Final Office Action Nov. 13, 2009, U.S. Appl. No. 11/043,813, Jan. 26, 2005, 15 p.
Rao, Office Action Mar. 30, 2009, U.S. Appl. No. 11/043,813, Jan. 26, 2005, 11 p.
Rao, Office Action Oct. 3, 2008, U.S. Appl. No. 11/043,813, Jan. 26, 2005, 23 p.
Chen, Examiner's Answer Aug. 16, 2012, U.S. Appl. No. 11/099,870, Apr. 6, 2005, 12 p.
Chen, Final Office Action Dec. 23, 2011, U.S. Appl. No. 11/099,870, Apr. 6, 2005, 12 p.
Chen, Office Action Jul. 6, 2011, U.S. Appl. No. 11/099,870, Apr. 6, 2005, 13 p.
Chen, Final Office Action Nov. 26, 2010, U.S. Appl. No. 11/099,870, Apr. 6, 2005, 9 p.
Chen, Office Action Jun. 24, 2010, U.S. Appl. No. 11/099,870, Apr. 6, 2005, 7 p.
Chen, Office Action Nov. 30, 2009, U.S. Appl. No. 11/099,870, Apr. 6, 2005, 8 p.
Chen, Final Office Action Apr. 14, 2009, U.S. Appl. No. 11/099,870, Apr. 6, 2005, 19 p.
Chen, Office Action Sep. 24, 2008, U.S. Appl. No. 11/099,870, Apr. 6, 2005, 7 p.
Chen, Office Action Apr. 25, 2008, U.S. Appl. No. 11/099,870, Apr. 6, 2005, 5 p.
Chen, Final Office Action Oct. 11, 2007, U.S. Appl. No. 11/099,870, Apr. 6, 2005, 16 p.
Chen, Office Action Aug. 24, 2006, U.S. Appl. No. 11/099,870, Apr. 6, 2005, 15 p.
Zhu, Examiner's Answer Aug. 16, 2012, U.S. Appl. No. 11/386,560, Mar. 22, 2006, 9 p.

Zhu, Final Office Action Feb. 16, 2012, U.S. Appl. No. 11/386,560, Mar. 22, 2006, 23 p.
Zhu, Office Action Sep. 30, 2011, U.S. Appl. No. 11/386,560, Mar. 22, 2006, 19 p.
Zhu, Final Office Action Mar. 3, 2011, U.S. Appl. No. 11/386,560, Mar. 22, 2006, 24 p.
Zhu, Office Action Sep. 15, 2010, U.S. Appl. No. 11/386,560, Mar. 22, 2006, 21 p.
Zhu, Office Action Mar. 31, 2010, U.S. Appl. No. 11/386,560, Mar. 22, 2006, 17 p.
Chen, Decision on Appeal Jun. 29, 2012, U.S. Appl. No. 11/637,550, Dec. 12, 2006, 9 p.
Chen, Examiner's Answer Mar. 30, 2009, U.S. Appl. No. 11/637,550, Dec. 12, 2006, 18 p.
Chen, Final Office Action May 22, 2008, U.S. Appl. No. 11/637,550, Dec. 12, 2006, 18 p.
Chen, Office Action Oct. 5, 2007, U.S. Appl. No. 11/637,550, Dec. 12, 2006, 20 p.
Chen, Final Office Action Jul. 27, 2012, U.S. Appl. No. 12/057,067, Mar. 27, 2008, 20 p.
Chen, Office Action Feb. 2, 2012, U.S. Appl. No. 12/057,067, Mar. 27, 2008, 18 p.
Chen, Final Office Action Jul. 28, 2011, U.S. Appl. No. 12/057,067, Mar. 27, 2008, 17 p.
Chen, Office Action Feb. 16, 2011, U.S. Appl. No. 12/057,067, Mar. 27, 2008, 22 p.
O'Neill, Final Office Action Jul. 17, 2012, U.S. Appl. No. 10/411,835, Apr. 11, 2003, 32 p.
O'Neill, Office Action Feb. 10, 2012, U.S. Appl. No. 10/411,835, Apr. 11, 2003, 26 p.
O'Neill, Advisory Action Jul. 29, 2011, U.S. Appl. No. 10/411,835, Apr. 11, 2003, 3 p.
O'Neill, Advisory Action Jun. 28, 2011, U.S. Appl. No. 10/411,835, Apr. 11, 2003, 3 p.
O'Neill, Final Office Action Apr. 11, 2011, U.S. Appl. No. 10/411,835, Apr. 11, 2003, 29 p.
O'Neill, Office Action Nov. 8, 2010, U.S. Appl. No. 10/411,835, Apr. 11, 2003, 26 p.
O'Neill, Office Action Aug. 26, 2009, U.S. Appl. No. 10/411,835, Apr. 11, 2003, 25 p.
Chen, Notice of Allowance Aug. 31, 2012, U.S. Appl. No. 10/412,045, Apr. 11, 2003, 10 p.
Chen, Final Office Action Jan. 25, 2012, U.S. Appl. No. 10/412,045, Apr. 11, 2003, 18 p.
Chen, Office Action Aug. 3, 2011, U.S. Appl. No. 10/412,045, Apr. 11, 2003, 18 p.
Chen, Final Office Action Apr. 19, 2010, U.S. Appl. No. 10/412,045, Apr. 11, 2003, 25 p.
Chen, Office Action Aug. 26, 2009, U.S. Appl. No. 10/412,045, Apr. 11, 2003, 17 p.
O'Neill, Office Action Jul. 23, 2012, U.S. Appl. No. 12/636,600, Dec. 11, 2009, 17 p.
Rao, Examiner's Answer May 26, 2011, U.S. Appl. No. 11/637,435, Dec. 12, 2006, 20 p.
Rao, Final Office Action Sep. 15, 2010, U.S. Appl. No. 11/637,435, Dec. 12, 2006, 15 p.
Rao, Office Action Sep. 10, 2009, U.S. Appl. No. 11/637,435, Dec. 12, 2006, 16 p.
Rao, Final Office Action Mar. 17, 2009, U.S. Appl. No. 11/637,435, Dec. 12, 2006, 15 p.
Rao, Office Action Sep. 22, 2008, U.S. Appl. No. 11/637,435, Dec. 12, 2006, 14 p.
Rao, Decision on Appeal Jun. 29, 2012, U.S. Appl. No. 10/706,362, Nov. 12, 2003, 6 p.
Rao, Examiner Answer Oct. 30, 2009, U.S. Appl. No. 10/706,362, Nov. 12, 2003, 24 p.
Rao, Final Office Action Apr. 15, 2009, U.S. Appl. No. 10/706,362, Nov. 12, 2003, 20 p.
Rao, Office Action Oct. 1, 2008, U.S. Appl. No. 10/706,362, Nov. 12, 2003, 19 p.
Rao, Office Action Jan. 9, 2008, U.S. Appl. No. 10/706,362, Nov. 12, 2003, 16 p.
Rao, Office Action Jul. 31, 2007, U.S. Appl. No. 10/706,362, Nov. 12, 2003, 17 p.
Rao, Office Action Dec. 5, 2006, U.S. Appl. No. 10/706,362, Nov. 12, 2003, 15 p.
McGhee, Decision on Appeal Jun. 6, 2012, U.S. Appl. No. 10/774,027, Feb. 6, 2004, 8 p.
McGhee, Examiner's Answer Oct. 30, 2009, U.S. Appl. No. 10/774,027, Feb. 6, 2004, 31 p.
McGhee, Final Office Action Apr. 24, 2009, U.S. Appl. No. 10/774,027, Feb. 6, 2004, 23 p.
McGhee, Office Action Oct. 15, 2008, U.S. Appl. No. 10/774,027, Feb. 6, 2004, 25 p.
McGhee, Office Action Mar. 4, 2008, U.S. Appl. No. 10/774,027, Feb. 6, 2004, 26 p.
Yang, Corrected Examiner's Answer Nov. 21, 2011, U.S. Appl. No. 12/030,757, Feb. 13, 2008, 2 p.
Yang, Examiner's Answer Nov. 10, 2011, U.S. Appl. No. 12/030,757, Feb. 13, 2008, 19 p.
Yang, Advisory Action Sep. 29, 2011, U.S. Appl. No. 12/030,757, Feb. 13, 2008, 3 p.
Yang, Final Office Action Jul. 14, 2011, U.S. Appl. No. 12/030,757, Feb. 13, 2008, 17 p.
Yang, Office Action Mar. 9, 2011, U.S. Appl. No. 12/030,757, Feb. 13, 2008, 33 p.
Rao, Final Office Action Nov. 20, 2012, U.S. Appl. No. 10/909,550, Aug. 2, 2004, 20 p.
Rao, Office Action Jun. 19, 2012, U.S. Appl. No. 10/909,550, Aug. 2, 2004, 24 p.
Rao, Advisory Action Oct. 8, 2010, U.S. Appl. No. 10/909,550, Aug. 2, 2004, 3 p.
Rao, Advisory Action Sep. 1, 2010, U.S. Appl. No. 10/909,550, Aug. 2, 2004, 3 p.
Rao, Final Office Action Jun. 3, 2010, U.S. Appl. No. 10/909,550, Aug. 2, 2004, 26 p.
Rao, Office Action Nov. 27, 2009, U.S. Appl. No. 10/909,550, Aug. 2, 2004, 17 p.
Rao, Office Action Jun. 23, 2009, U.S. Appl. No. 10/909,550, Aug. 2, 2004, 7 p.
Rao, Final Office Action Sep. 25, 2008, U.S. Appl. No. 10/909,550, Aug. 2, 2004, 19 p.
Rao, Office Action Apr. 23, 2008, U.S. Appl. No. 10/909,550, Aug. 2, 2004, 29 p.
Chia, Notice of Allowance May 31, 2012, U.S. Appl. No. 10/943,455, Sep. 17, 2004, 11 p.
Chia, Final Office Action Dec. 8, 2011, U.S. Appl. No. 10/943,455, Sep. 17, 2004, 23 p.
Chia, Office Action Jun. 22, 2010, U.S. Appl. No. 10/943,455, Sep. 17, 2004, 34 p.
Chia, Office Action Jan. 7, 2010, U.S. Appl. No. 10/943,455, Sep. 17, 2004, 21 p.
Chia, Office Action Jun. 11, 2009, U.S. Appl. No. 10/943,455, Sep. 17, 2004, 18 p.
Chia, Final Office Action Dec. 24, 2008, U.S. Appl. No. 10/943,455, Sep. 17, 2004, 17 p.
Chia, Office Action Mar. 21, 2008, U.S. Appl. No. 10/943,455, Sep. 17, 2004, 22 p.
Wang, Examiner's Answer Aug. 19, 2011, U.S. Appl. No. 11/183,199, Jul. 15, 2005, 23 p.
Wang, Advisory Action Feb. 23, 2011, U.S. Appl. No. 11/183,199, Jul. 15, 2005, 2 p.
Wang, Final Office Action Nov. 1, 2010, U.S. Appl. No. 11/183,199, Jul. 15, 2005, 19 p.
Wang, Office Action Apr. 28, 2010, U.S. Appl. No. 11/183,199, Jul. 15, 2005, 17 p.
Wang, Final Office Action Aug. 17, 2009, U.S. Appl. No. 11/183,199, Jul. 15, 2005, 16 p.
Wang, Office Action Feb. 13, 2009, U.S. Appl. No. 11/183,199, Jul. 15, 2005, 16 p.
Wang, Interview Summary Feb. 5, 2009, U.S. Appl. No. 11/183,199, Jul. 15, 2005, 2 p.
Wang, Final Office Action Oct. 28, 2008, U.S. Appl. No. 11/183,199, Jul. 15, 2005, 19 p.

Wang, Office Action Apr. 17, 2008, U.S. Appl. No. 11/183,199, Jul. 15, 2005, 41 p.
Wang, Final Office Action Oct. 9, 2007, U.S. Appl. No. 11/183,199, Jul. 15, 2005, 13 p.
Wang, Office Action Jan. 9, 2007, U.S. Appl. No. 11/183,199, Jul. 15, 2005, 15 p.
Randall, Examiner's Answer Jun. 9, 2010, U.S. Appl. No. 10/955,021, Sep. 30, 2004, 22 p.
Randall, Final Office Action Nov. 6, 2009, U.S. Appl. No. 10/955,021, Sep. 30, 2004, 25 p.
Randall, Office Action Apr. 1, 2009, U.S. Appl. No. 10/955,021, Sep. 30, 2004, 16 p.
Randall, Office Action Oct. 17, 2008, U.S. Appl. No. 10/955,021, Sep. 30, 2004, 16 p.
Randall, Office Action May 1, 2008, U.S. Appl. No. 10/955,021, Sep. 30, 2004, 18 p.
Daley, Corrected Examiner's Answer Nov. 1, 2011, U.S. Appl. No. 11/039,000, Jan. 18, 2005, 2 p.
Daley, Examiner's Answer Oct. 24, 2011, U.S. Appl. No. 11/039,000, Jan. 18, 2005, 20 p.
Daley, Final Office Action Feb. 17, 2011, U.S. Appl. No. 11/039,000, Jan. 18, 2005, 15 p.
Daley, Office Action Aug. 30, 2010, U.S. Appl. No. 11/039,000, Jan. 18, 2005, 15 p.
Daley, Final Office Action Nov. 27, 2009, U.S. Appl. No. 11/039,000, Jan. 18, 2005, 14 p.
Daley, Office Action May 28, 2009, U.S. Appl. No. 11/039,000, Jan. 18, 2005, 13 p.
Daley, Final Office Action Dec. 3, 2008, U.S. Appl. No. 11/039,000, Jan. 18, 2005, 15 p.
Daley, Office Action Jun. 5, 2008, U.S. Appl. No. 11/039,000, Jan. 18, 2005, 25 p.
Kapadekar, Examiner's Answer Mar. 2, 2011, U.S. Appl. No. 11/552,942, Oct. 25, 2006, 18 p.
Kapadekar, Final Office Action Jun. 11, 2010, U.S. Appl. No. 11/552,942, Oct. 25, 2006, 17 p.
Kapadekar, Office Action Oct. 30, 2009, U.S. Appl. No. 11/552,942, Oct. 25, 2006, 15 p.
Kapadekar, Final Office Action Jul. 24, 2009, U.S. Appl. No. 11/552,942, Oct. 25, 2006, 12 p.
Kapadekar, Office Action Jan. 14, 2009, U.S. Appl. No. 11/552,942, Oct. 25, 2006, 8 p.
Logan, Examiner's Answer Jul. 28, 2011, U.S. Appl. No. 11/500,734, Aug. 7, 2006, 2 p.
Logan, Examiner's Answer Jun. 28, 2011, U.S. Appl. No. 11/500,734, Aug. 7, 2006, 25 p.
Logan, Advisory Action Feb. 17, 2011, U.S. Appl. No. 11/500,734, Aug. 7, 2006, 2 p.
Logan, Office Action Sep. 29, 2010, U.S. Appl. No. 11/500,734, Aug. 7, 2006, 24 p.
Logan, Office Action Apr. 27, 2010, U.S. Appl. No. 11/500,734, Aug. 7, 2006, 23 p.
Logan, Final Office Action Dec. 14, 2009, U.S. Appl. No. 11/500,734, Aug. 7, 2006, 22 p.
Logan, Office Action Nov. 26, 2008, U.S. Appl. No. 11/500,734, Aug. 7, 2006, 20 p.
Rao, Examiner's Answer Jun. 28, 2011, U.S. Appl. No. 11/385,502, Mar. 21, 2006, 17 p.
Rao, Final Office Action Nov. 26, 2010, U.S. Appl. No. 11/385,502, Mar. 21, 2006, 11 p.
Rao, Office Action Jun. 25, 2010, U.S. Appl. No. 11/385,502, Mar. 21, 2006, 10 p.
Rao, Final Office Action Dec. 15, 2009, U.S. Appl. No. 11/385,502, Mar. 21, 2006, 12 p.
Rao, Office Action May 12, 2009, U.S. Appl. No. 11/385,502, Mar. 21, 2006, 9 p.
Motta, Final Office Action Nov. 19, 2012, U.S. Appl. No. 11/449,259, Jun. 7, 2006, 25 p.
Motta, Office Action Jul. 26, 2012, U.S. Appl. No. 11/449,259, Jun. 7, 2006, 20 p.
Motta, Decision on Appeal Jun. 20, 2012, U.S. Appl. No. 11/449,259, Jun. 7, 2006, 7 p.
Motta, Examiner's Answer Jul. 23, 2009, U.S. Appl. No. 11/449,259, Jun. 7, 2006, 28 p.
Motta, Interview Summary Feb. 12, 2009, U.S. Appl. No. 11/449,259, Jun. 7, 2006, 4 p.
Motta, Advisory Action Jan. 27, 2009, U.S. Appl. No. 11/449,259, Jun. 7, 2006, 3 p.
Motta, Final Office Action Nov. 13, 2008, U.S. Appl. No. 11/449,259, Jun. 7, 2006, 18 p.
Motta, Office Action Jul. 10, 2008, U.S. Appl. No. 11/449,259, Jun. 7, 2006, 22 p.
Motta, Examiner's Answer Nov. 25, 2011, U.S. Appl. No. 11/590,137, Oct. 30, 2006, 11 p.
Motta, Final Office Action Jul. 19, 2011, U.S. Appl. No. 11/590,137, Oct. 30, 2006, 11 p.
Motta, Office Action Mar. 11, 2011, U.S. Appl. No. 11/590,137, Oct. 30, 2006, 12 p.
Daley, Final Office Action Mar. 17, 2011, U.S. Appl. No. 11/676,997, Feb. 20, 2007, 34 p.
Daley, Office Action Aug. 17, 2010, U.S. Appl. No. 11/676,997, Feb. 20, 2007, 31 p.
Daley, Office Action Feb. 22, 2010, U.S. Appl. No. 11/676,997, Feb. 20, 2007, 27 p.
Motta, Interview Summary Apr. 12, 2012, U.S. Appl. No. 11/829,520, Jul. 27, 2007, 3 p.
Motta, Final Office Action Jan. 13, 2012, U.S. Appl. No. 11/829,520, Jul. 27, 2007, 27 p.
Motta, Interview Summary Nov. 29, 2011, U.S. Appl. No. 11/829,520, Jul. 27, 2007, 3 p.
Motta, Office Action Sep. 1, 2011, U.S. Appl. No. 11/829,520, Jul. 27, 2007, 14 p.
Daley, Examiner's Answer Nov. 2, 2010, U.S. Appl. No. 11/839,396, Aug. 15, 2007, 15 p.
Daley, Final Office Action May 25, 2010, U.S. Appl. No. 11/839,396, Aug. 15, 2007, 16 p.
Daley, Interview Summary Feb. 25, 2010, U.S. Appl. No. 11/839,396, Aug. 15, 2007, 3 p.
Daley, Office Action Dec. 21, 2009, U.S. Appl. No. 11/839,396, Aug. 15, 2007, 14 p.
Daley, Office Action Jul. 29, 2009, U.S. Appl. No. 11/839,396, Aug. 15, 2007, 23 p.
Rao, Final Office Action Sep. 21, 2012, U.S. Appl. No. 11/867,370, Oct. 4, 2007, 14 p.
Rao, Office Action May 3, 2012, U.S. Appl. No. 11/867,370, Oct. 4, 2007, 13 p.
Rao, Final Office Action Dec. 22, 2010, U.S. Appl. No. 11/867,370, Oct. 4, 2007, 10 p.
Rao, Office Action Sep. 3, 2010, U.S. Appl. No. 11/867,370, Oct. 4, 2007, 11 p.
Rao, Examiner's Answer Apr. 12, 2012, U.S. Appl. No. 11/871,867, Oct. 12, 2007, 14 p.
Rao, Final Office Action Oct. 11, 2011, U.S. Appl. No. 11/871,867, Oct. 12, 2007, 14 p.
Rao, Interview Summary Aug. 5, 2011, U.S. Appl. No. 11/871,867, Oct. 12, 2007, 4 p.
Rao, Office Action Apr. 29, 2011, U.S. Appl. No. 11/871,867, Oct. 12, 2007, 13 p.
Rao, Final Office Action Sep. 30, 2010, U.S. Appl. No. 11/871,867, Oct. 12, 2007, 14 p.
Rao, Office Action Mar. 25, 2010, U.S. Appl. No. 11/871,867, Oct. 12, 2007, 11 p.
Rao, Office Action Aug. 10, 2009, U.S. Appl. No. 11/871,867, Oct. 12, 2007, 14 p.
Chowdhary, Decision on Appeal Nov. 1, 2012, U.S. Appl. No. 11/005,312, Dec. 6, 2004, 8 p.
Chowdhary, Order Apr. 27, 2009, U.S. Appl. No. 11/005,312, Dec. 6, 2004, 3 p.
Chowdhary, Examiner's Answer Aug. 20, 2008, U.S. Appl. No. 11/005,312, Dec. 6, 2004, 28 p.
Chowdhary, Office Action Sep. 5, 2006, Nov. 1, 2012, U.S. Appl. No. 11/005,312, Dec. 6, 2004, 29 p.
Chowdhary, Final Office Action Mar. 21, 2007, U.S. Appl. No. 11/005,312, Dec. 6, 2004, 27 p.

Chowdhary, Office Action Jan. 11, 2008, U.S. Appl. No. 11/005,312, Dec. 6, 2004, 24 p.
Rao, Final Office Action Oct. 16, 2012, U.S. Appl. No. 13/350,355, Jan. 13, 2012, 18 p.
Rao, Office Action May 16, 2012, U.S. Appl. No. 13/350,355, Jan. 13, 2012, 28 p.
Okkonen, Office Action Dec. 28, 2005, U.S. Appl. No. 10/417,285, Apr. 15, 2003, 21 p.
Okkonen, Final Office Action May 1, 2006, U.S. Appl. No. 10/417,285, Apr. 15, 2003, 41 p.
Okkonen, Office Action Jan. 29, 2007, U.S. Appl. No. 10/417,285, Apr. 15, 2003, 41 p.
Okkonen, Office Action Aug. 6, 2007, U.S. Appl. No. 10/417,285, Apr. 15, 2003, 6 p.
Okkonen, Office Action Dec. 9, 2009, U.S. Appl. No. 11/650,777, Jan. 8, 2007, 17 p.
Okkonen, Final Office Action May 13, 2010, U.S. Appl. No. 11/650,777, Jan. 8, 2007, 24 p.
O'Neill, Office Action Jun. 26, 2006, U.S. Appl. No. 10/631,567, Jul. 31, 2003, 18 p.
O'Neill, Final Office Action Apr. 10, 2007, U.S. Appl. No. 10/631,567, Jul. 31, 2003, 31 p.
O'Neill, Office Action Jan. 14, 2008, U.S. Appl. No. 10/631,567, Jul. 31, 2003, 41 p.
O'Neill, Office Action Jul. 9, 2008, U.S. Appl. No. 10/631,567, Jul. 31, 2003, 14 p.
O'Neill, Final Office Action Jan. 22, 2009, U.S. Appl. No. 10/631,567, Jul. 31, 2003, 14 p.
Chen, Office Action Jan. 8, 2007, U.S. Appl. No. 10/646,324, Aug. 22, 2003, 9 p.
Chen, Office Action May 13, 2011, U.S. Appl. No. 11/923,383, Oct. 24, 2007, 22 p.
Chen, Final Office Action Nov. 10, 2011, U.S. Appl. No. 11/923,383, Oct. 24, 2007, 27 p.
O'Neill, Office Action Oct. 23, 2006, U.S. Appl. No. 10/654,149, Sep. 3, 2003, 13 p.
O'Neill, Office Action May 31, 2007, U.S. Appl. No. 10/654,149, Sep. 3, 2003, 13 p.
O'Neill, Final Office Action Dec. 13, 2007, U.S. Appl. No. 10/654,149, Sep. 3, 2003, 15 p.
O'Neill, Office Action Dec. 4, 2008, U.S. Appl. No. 10/654,149, Sep. 3, 2003, 14 p.
O'Neill, Final Office Action May 26, 2009, U.S. Appl. No. 10/654,149, Sep. 3, 2003, 15 p.
Rao, Office Action Feb. 7, 2007, U.S. Appl. No. 10/654,412, Sep. 3, 2003, 9 p.
Rao, Final Office Action Aug. 24, 2007, U.S. Appl. No. 10/654,412, Sep. 3, 2003, 13 p.
Rao, Office Action Mar. 5, 2008, U.S. Appl. No. 10/654,412, Sep. 3, 2003, 15 p.
Chen, Office Action Nov. 20, 2006, U.S. Appl. No. 10/646,319, Aug. 22, 2003, 8 p.
Chen, Office Action Aug. 16, 2011, U.S. Appl. No. 12/032,809, Feb. 18, 2008, 20 p.
Chen, Final Office Action Jan. 19, 2012, U.S. Appl. No. 12/032,809, Feb. 18, 2008, 24 p.
Rao, Office Action Aug. 16, 2006, U.S. Appl. No. 10/695,713, Oct. 29, 2003, 12 p.
Rao, Final Office Action Dec. 20, 2006, U.S. Appl. No. 10/695,713, Oct. 29, 2003, 13 p.
Rao, Office Action Oct. 21, 2009, U.S. Appl. No. 11/688,820, Mar. 20, 2007, 10 p.
Rao, Final Office Action May 3, 2010, U.S. Appl. No. 11/688,820, Mar. 20, 2007, 14 p.
Rao, Office Action Dec. 30, 2004, U.S. Appl. No. 10/689,309, Oct. 20, 2003, 5 p.
Rao, Office Action Jun. 24, 2009, U.S. Appl. No. 11/251,046, Oct. 14, 2005, 8 p.
Lilley, Office Action Oct. 24, 2006, U.S. Appl. No. 10/681,861, Oct. 8, 2003, 24 p.
Lilley, Final Office Action Jul. 23, 2007, U.S. Appl. No. 10/681,861, Oct. 8, 2003, 18 p.
Lilley, Office Action Nov. 16, 2007, U.S. Appl. No. 10/681,861, Oct. 8, 2003, 18 p.
Lilley, Final Office Action Jun. 16, 2008, U.S. Appl. No. 10/681,861, Oct. 8, 2003, 24 p.
O'Neill, Office Action Mar. 22, 2007, U.S. Appl. No. 10/721,658, Nov. 25, 2003, 14 p.
O'Neill, Final Office Action Sep. 25, 2007, U.S. Appl. No. 10/721,658, Nov. 25, 2003, 9 p.
O'Neill, Final Office Action Feb. 20, 2008, U.S. Appl. No. 10/721,658, Nov. 25, 2003, 13 p.
Rao, Office Action Oct. 5, 2004, U.S. Appl. No. 10/701,848, Nov. 5, 2003, 12 p.
Rao, Final Office Action May 5, 2005, U.S. Appl. No. 10/701,848, Nov. 5, 2003, 14 p.
Rao, Office Action Nov. 23, 2005, U.S. Appl. No. 10/701,848, Nov. 5, 2003, 13 p.
Rao, Final Office Action Aug. 15, 2006, U.S. Appl. No. 10/701,848, Nov. 5, 2003, 16 p.
Rao, Office Action Nov. 14, 2006, U.S. Appl. No. 10/706,219, Nov. 12, 2003, 12 p.
Rao, Final Office Action May 2, 2007, U.S. Appl. No. 10/706,219, Nov. 12, 2003, 17 p.
Rao, Office Action Dec. 13, 2007, U.S. Appl. No. 10/706,219, Nov. 12, 2003, 13 p.
Rao, Office Action Jun. 25, 2008, U.S. Appl. No. 10/706,219, Nov. 12, 2003, 10 p.
Rao, Final Office Action Jan. 6, 2009, U.S. Appl. No. 10/706,219, Nov. 12, 2003, 16 p.
Rao, Office Action Jul. 22, 2009, U.S. Appl. No. 10/706,219, Nov. 12, 2003, 6 p.
Rao, Office Action Mar. 26, 2009, U.S. Appl. No. 11/401,708, Apr. 11, 2006, 20 p.
Rao, Office Action Aug. 9, 2005, U.S. Appl. No. 10/695,524, Oct. 28, 2003, 19 p.
Chia, Office Action May 28, 2008, U.S. Appl. No. 10/719,114, Nov. 21, 2003, 10 p.
Chia, Final Office Action Dec. 2, 2008, U.S. Appl. No. 10/719,114, Nov. 21, 2003, 8 p.
Chia, Final Office Action May 4, 2009, U.S. Appl. No. 10/719,114, Nov. 21, 2003, 11 p.
Chia, Office Action Aug. 19, 2009, U.S. Appl. No. 10/719,114, Nov. 21, 2003, 8 p.
Chia, Final Office Action Mar. 17, 2010, U.S. Appl. No. 10/719,114, Nov. 21, 2003, 9 p.
Jacobi, Office Action Dec. 10, 2004, U.S. Appl. No. 10/697,458, Oct. 30, 2003, 16 p.
Jacobi, Final Office Action Jun. 14, 2005, U.S. Appl. No. 10/697,458, Oct. 30, 2003, 16 p.
Gustafson, Office Action Mar. 4, 2008, U.S. Appl. No. 10/761,735, Jan. 20, 2004, 25 p.
Gustafson, Office Action Sep. 8, 2008, U.S. Appl. No. 10/761,735, Jan. 20, 2004, 25 p.
Gustafson, Final Office Action Mar. 20, 2009, U.S. Appl. No. 10/761,735, Jan. 20, 2004, 27 p.
Rao, Office Action Sep. 25, 2008, U.S. Appl. No. 11/083,596, Mar. 18, 2005, 7 p.
Rao, Office Action Oct. 19, 2004, U.S. Appl. No. 10/765,817, Jan. 27, 2004, 8 p.
Rao, Office Action Feb. 4, 2008, U.S. Appl. No. 10/782,083, Feb. 19, 2004, 21 p.
Rao, Final Office Action Jul. 15, 2008, U.S. Appl. No. 10/782,083, Feb. 19, 2004, 25 p.
Gustafson, Office Action Jul. 24, 2007, U.S. Appl. No. 10/790,340, Mar. 1, 2004, 21 p.
Gustafson, Office Action Jun. 12, 2008, U.S. Appl. No. 10/790,340, Mar. 1, 2004, 20 p.
Gustafson, Office Action Dec. 23, 2008, U.S. Appl. No. 10/790,340, Mar. 1, 2004, 21 p.
Gustafson, Final Office Action Jul. 6, 2009, U.S. Appl. No. 10/790,340, Mar. 1, 2004, 21 p.
Lilley, Final Office Action Jul. 25, 2007, U.S. Appl. No. 10/646,975, Aug. 22, 2003, 13 p.

Lilley, Office Action Oct. 31, 2007, U.S. Appl. No. 10/646,975, Aug. 22, 2003, 15 p.
Lilley, Final Office Action Apr. 16, 2008, U.S. Appl. No. 10/646,975, Aug. 22, 2003, 14 p.
Rao, Office Action Jun. 30, 2006, U.S. Appl. No. 10/797,176, Mar. 10, 2004, 15 p.
Rao, Final Office Action Jul. 17, 2007, U.S. Appl. No. 10/797,176, Mar. 10, 2004, 26 p.
Rao, Final Office Action Oct. 31, 2007, U.S. Appl. No. 10/797,176, Mar. 10, 2004, 29 p.
Rao, Office Action Apr. 14, 2008, U.S. Appl. No. 10/797,176, Mar. 10, 2004, 31p.
Rao, Office Action Oct. 16, 2008, U.S. Appl. No. 10/797,176, Mar. 10, 2004, 33 p.
Rao, Final Office Action Nov. 25, 2009, U.S. Appl. No. 10/797,176, Mar. 10, 2004, 41 p.
Rao, Final Office Action Aug. 19, 2010, U.S. Appl. No. 10/797,176, Mar. 10, 2004, 5 p.
Okkonnen, Office Action Feb. 28, 2005, U.S. Appl. No. 10/807,694, Mar. 24, 2004, 18 p.
Okkonnen, Final Office Action Aug. 10, 2005, U.S. Appl. No. 10/807,694, Mar. 24, 2004, 17 p.
Okkonen, Office Action Mar. 14, 2006, U.S. Appl. No. 10/807,694, Mar. 24, 2004, 21 p.
Okkonen, Office Action Oct. 24, 2006, U.S. Appl. No. 10/807,694, Mar. 24, 2004, 16 p.
Okkonen, Office Action Jul. 10, 2007, U.S. Appl. No. 10/807,694, Mar. 24, 2004, 19 p.
Okkonen, Final Office Action Dec. 18, 2007, U.S. Appl. No. 10/807,694, 03/64/04, 22 p.
Okkonen, Office Action May 12, 2008, U.S. Appl. No. 10/807,694, Mar. 24, 2004, 22 p.
Okkonen, Final Office Action Nov. 20, 2008, U.S. Appl. No. 10/807,694, Mar. 24, 2004, 22 p.
Okkonen, Office Action Jun. 25, 2009, U.S. Appl. No. 10/807,694, Mar. 24, 2004, 34 p.
McGhee, Office Action Sep. 27, 2006, U.S. Appl. No. 10/797,825, Mar. 10, 2004, 7 p.
McGhee, Final Office Action Jun. 25, 2007, U.S. Appl. No. 10/797,825, Mar. 10, 2004, 6 p.
Yang, Office Action Jan. 28, 2008, U.S. Appl. No. 10/802,191, Mar. 17, 2004, 18 p.
Yang, Final Office Action Jun. 6, 2008, U.S. Appl. No. 10/802,191, Mar. 17, 2004, 19 p.
Yang, Office Action Sep. 5, 2008, U.S. Appl. No. 10/802,191, Mar. 17, 2004, 16 p.
Qumei, Final Office Action Nov. 23, 2007, U.S. Appl. No. 10/813,212, Mar. 30, 2004, 11 p.
Yang, Office Action Sep. 21, 2006, U.S. Appl. No. 10/635,991, Aug. 7, 2003, 10 p.
Yang, Office Action Jun. 2, 2010, U.S. Appl. No. 12/014,549, Jan. 15, 2008, 8 p.
Yang, Final Office Action Sep. 16, 2010, U.S. Appl. No. 12/014,549, Jan. 15, 2008, 7 p.
Yang, Office Action Nov. 2, 2006, U.S. Appl. No. 10/887,490, Jul. 8, 2004, 12 p.
Yang, Final Office Action Apr. 17, 2007, U.S. Appl. No. 10/887,490, Jul. 8, 2004, 13 p.
Marolia, Final Office Action Jan. 30, 2008, U.S. Appl. No. 10/852,396, May 24, 2004, 17 p.
Marolia, Office Action May 28, 2008, U.S. Appl. No. 10/852,396, May 24, 2004, 20 p.
Marolia, Office Action Dec. 8, 2008, U.S. Appl. No. 10/852,396, May 24, 2004, 19 p.
Marolia, Final Office Action Jun. 17, 2009, U.S. Appl. No. 10/852,396, May 24, 2004, 24 p.
Marolia, Office Action Dec. 14, 2009, U.S. Appl. No. 10/852,396, May 24, 2004, 19 p.
Marolia, Office Action Jun. 3, 2005, U.S. Appl. No. 10/888,841, Jul. 9, 2004, 8 p.
Marolia, Final Office Action Dec. 6, 2005, U.S. Appl. No. 10/888,841, Jul. 9, 2004, 10 p.
Marolia, Office Action May 4, 2006, U.S. Appl. No. 10/888,841, Jul. 9, 2004, 13 p.
Marolia, Final Office Action Jan. 12, 2007, U.S. Appl. No. 10/888,841, Jul. 9, 2004, 15 p.
Marolia, Office Action Jun. 18, 2007, U.S. Appl. No. 10/888,841, Jul. 9, 2004, 16 p.
Marolia, Final Office Action Nov. 27, 2007, U.S. Appl. No. 10/888,841, Jul. 9, 2004, 17 p.
Marolia, Office Action Apr. 28, 2009, U.S. Appl. No. 10/888,841, Jul. 9, 2004, 15 p.
Qumei, Office Action Apr. 21, 2008, U.S. Appl. No. 10/864,095, Jun. 9, 2004, 15 p.
Marolia, Office Action Dec. 11, 2007, U.S. Appl. No. 10/879,869, Jun. 28, 2004, 10 p.
Marolia, Final Office Action May 30, 2008, U.S. Appl. No. 10/879,869, Jun. 28, 2004, 15 p.
Marolia, Office Action Aug. 18, 2008, U.S. Appl. No. 10/879,869, Jun. 28, 2004, 17 p.
Marolia, Final Office Action Jan. 28, 2009, U.S. Appl. No. 10/879,869, Jun. 28, 2004, 18 p.
Rao, Office Action Jul. 25, 2007, U.S. Appl. No. 10/860,964, Jun. 4, 2004, 22 p.
Rao, Final Office Action Jan. 7, 2008, U.S. Appl. No. 10/860,964, Jun. 4, 2004, 26 p.
Rao, Office Action Apr. 30, 2008, U.S. Appl. No. 10/860,964, Jun. 4, 2004, 23 p.
Rao, Final Office Action Oct. 28, 2008, U.S. Appl. No. 10/860,964, Jun. 4, 2004, 29 p.
Yang, Office Action Jun. 27, 2007, U.S. Appl. No. 10/860,978, Jun. 4, 2004, 14 p.
Yang, Final Office Action Dec. 7, 2007, U.S. Appl. No. 10/860,978, Jun. 4, 2004, 16 p.
Yang, Office Action Jun. 20, 2008, U.S. Appl. No. 10/860,978, Jun. 4, 2004, 13 p.
Yang, Office Action Dec. 23, 2008, U.S. Appl. No. 10/860,978, Jun. 4, 2004, 13 p.
Yang, Final Office Action Jun. 19, 2009, U.S. Appl. No. 10/860,978, Jun. 4, 2004, 16 p.
Rao, Office Action Aug. 24, 2007, U.S. Appl. No. 10/868,050, Jun. 15, 2004, 15 p.
Rao, Office Action Feb. 4, 2008, U.S. Appl. No. 10/868,050, Jun. 15, 2004, 16 p.
Rao, Final Office Action Aug. 6, 2008, U.S. Appl. No. 10/868,050, Jun. 15, 2004, 18 p.
Rao, Office Action Apr. 15, 2008, U.S. Appl. No. 10/899,513, Jul. 26, 2004, 14 p.
Rao, Final Office Action Oct. 24, 2008, U.S. Appl. No. 10/899,513, Jul. 26, 2004, 16 p.
Rao, Office Action Jun. 11, 2007, U.S. Appl. No. 10/902,452, Jul. 29, 2004, 13 p.
Rao, Final Office Action Dec. 20, 2007, U.S. Appl. No. 10/902,452, Jul. 29, 2004, 10 p.
Rao, Final Office Action Jun. 23, 2008, U.S. Appl. No. 10/902,425, Jul. 29, 2004, 14 p.
Rao, Office Action Jan. 5, 2009, U.S. Appl. No. 10/902,452, Jul. 29, 2004, 16 p.
Rao, Final Office Action Jul. 20, 2009, U.S. Appl. No. 10/902,452, Jul. 29, 2004, 16 p.
Rao, Office Action May 13, 2010, U.S. Appl. No. 10/902,452, Jul. 29, 2004, 16 p.
Qumei, Office Action Jul. 12, 2007, U.S. Appl. No. 10/909,519, Aug. 2, 2004, 17 p.
Qumei, Final Office Action Dec. 20, 2007, U.S. Appl. No. 10/909,519, Aug. 2, 2004, 11 p.
Qumei, Office Action May 29, 2008, U.S. Appl. No. 10/909,519, Aug. 2, 2004, 21 p.
Qumei, Final Office Action Nov. 17, 2008, U.S. Appl. No. 10/909,519, Aug. 2, 2004, 24 p.
Qumei, Office Action Apr. 28, 2009, U.S. Appl. No. 10/909,519, Aug. 2, 2004, 23 p.
Chen, Office Action May 14, 2008, U.S. Appl. No. 10/932,175, Sep. 1, 2004, 18 p.

Chen, Final Office Action Feb. 6, 2009, U.S. Appl. No. 10/932,175, Sep. 1, 2004, 15 p.
Chen, Office Action Mar. 1, 2010, U.S. Appl. No. 10/932,175, Sep. 1, 2004, 16 p.
Chen, Final Office Action Sep. 21, 2010, U.S. Appl. No. 10/932,175, Sep. 1, 2004, 17 p.
Okkonen, Office Action Jan. 5, 2007, U.S. Appl. No. 10/945,466, Sep. 20, 2004, 5 p.
Okkonen, Office Action Aug. 10, 2007, U.S. Appl. No. 10/945,466, Sep. 20, 2004, 5 p.
Okkonen, Final Office Action Jan. 9, 2008, U.S. Appl. No. 10/945,466, Sep. 20, 2004, 7 p.
Okkonen, Office Action May 12, 2008, U.S. Appl. No. 10/945,466, Sep. 20, 2004, 6 p.
Okkonen, Office Action Nov. 12, 2008, U.S. Appl. No. 10/945,466, Sep. 20, 2004, 5 p.
Okkonen, Office Action Apr. 14, 2009, U.S. Appl. No. 10/945,466, Sep. 20, 2004, 5 p.
Rao, Office Action Aug. 27, 2007, U.S. Appl. No. 10/950,764, Sep. 27, 2004, 14 p.
Rao, Final Office Action Mar. 4, 2008, U.S. Appl. No. 10/950,746, Sep. 27, 2004, 17 p.
Rao, Office Action Nov. 3, 2008, U.S. Appl. No. 10/950,764, Sep. 27, 2004, 12 p.
Rao, Final Office Action Jun. 30, 2009, U.S. Appl. No. 10/950,764, Sep. 27, 2004, 15 p.
Chen, Office Action Jan. 29, 2008, U.S. Appl. No. 10/958,148, Oct. 4, 2004, 16 p.
Chen, Final Office Action Aug. 20, 2008, U.S. Appl. No. 10/958,148, Oct. 4, 2004, 19 p.
Chen, Office Action Apr. 14, 2009, U.S. Appl. No. 10/958,148, Oct. 4, 2004, 11 p.
Chen, Final Office Action Nov. 25, 2009, U.S. Appl. No. 10/958,148, Oct. 4, 2004, 12 p.
Chen, Office Action Apr. 1, 2010, U.S. Appl. No. 10/958,148, Oct. 4, 2004, 13 p.
Gustafson, Office Action Sep. 11, 2007, U.S. Appl. No. 11/010,913, Dec. 13, 2004, 27 p.
Gustafson, Office Action Feb. 1, 2008, U.S. Appl. No. 11/010,913, Dec. 13, 2004, 29 p.
Gustafson, Final Office Action Feb. 18, 2010, U.S. Appl. No. 11/010,913, Dec. 13, 2004, 31 p.
Ren, Office Action Jan. 22, 2008, U.S. Appl. No. 10/989,628, Nov. 16, 2004, 8 p.
Ren, Office Action Aug. 18, 2008, U.S. Appl. No. 10/989,628, Nov. 16, 2004, 7 p.
Ren, Final Office Action Nov. 24, 2009, U.S. Appl. No. 10/989,628, Nov. 16, 2004, 9 p.
Slyz, Office Action Mar. 1, 2010, U.S. Appl. No. 11/874,102, Oct. 17, 2007, 13 p.
Qumei, Office Action Apr. 9, 2007, U.S. Appl. No. 10/698,665, Oct. 30, 2003, 22 p.
Qumei, Office Action Jul. 29, 2010, U.S. Appl. No. 11/852,933, Sep. 10, 2007, 14 p.
Qumei, Final Office Action Feb. 17, 2011, U.S. Appl. No. 11/852,933, Sep. 10, 2007, 19 p.
Chen, Office Action Apr. 19, 2007, U.S. Appl. No. 10/903,394, Jul. 30, 2004, 31 p.
Chen, Final Office Action Oct. 18, 2007, U.S. Appl. No. 10/903,394, Jul. 30, 2004, 34 p.
Chen, Office Action May 13, 2008, U.S. Appl. No. 10/903,394, Jul. 30, 2004, 14 p.
Chen, Office Action Nov. 26, 2008, U.S. Appl. No. 10/903,394, Jul. 30, 2004, 14 p.
Chen, Final Office Action Apr. 21, 2009, U.S. Appl. No. 10/903,394, Jul. 30, 2004, 21 p.
Chen, Office Action Oct. 30, 2009, U.S. Appl. No. 10/903,394, Jul. 30, 2004, 19 p.
Chen, Final Office Action Apr. 29, 2010, U.S. Appl. No. 10/903,394, Jul. 30, 2004, 24 p.
Rao, Office Action Feb. 4, 2008, U.S. Appl. No. 11/047,212, Jan. 31, 2005, 9 p.
Rao, Final Office Action Sep. 30, 2008, U.S. Appl. No. 11/047,212, Jan. 31, 2005, 8 p.
Rao, Office Action Feb. 2, 2009, U.S. Appl. No. 11/047,212, Jan. 31, 2005, 8 p.
Rao, Final Office Action Sep. 25, 2009, U.S. Appl. No. 11/047,212, Jan. 31, 2005, 9 p.
Rao, Office Action Jan. 22, 2010, U.S. Appl. No. 11/047,212, Jan. 31, 2005, 9 p.
Rao, Final Office Action Jun. 10, 2010, U.S. Appl. No. 11/047,212, Jan. 31, 2005, 11 p.
Rao, Office Action Jan. 14, 2011, U.S. Appl. No. 11/047,212, Jan. 31, 2005, 9 p.
Kokkinen, Office Action Feb, 23, 2007, U.S. Appl. No. 10/688,640, Oct. 17, 2003, 23 p.
Kokkinen, Office Action Aug. 21, 2007, U.S. Appl. No. 10/688,640, Oct. 17, 2003, 23 p.
Kokkinen, Office Action Jul. 18, 2008, U.S. Appl. No. 10/688,640, Oct. 17, 2003, 28 p.
Kokkinen, Office Action Dec. 30, 2008, U.S. Appl. No. 10/688,640, Oct. 17, 2003, 29 p.
Kokkinen, Office Action Jul. 21, 2009, U.S. Appl. No. 10/688,640, Oct. 17, 2003, 30 p.
Kokkinen, Office Action Feb. 24, 2010, U.S. Appl. No. 10/688,640, Oct. 17, 2003, 33 p.
Kokkinen, Office Action Aug. 6, 2010, U.S. Appl. No. 10/688,640, Oct. 17, 2003, 26 p.
Okkonen, Office Action Apr. 19, 2007, U.S. Appl. No. 10/788,768, Feb. 27, 2004, 14 p.
Okkonen, Final Office Action Oct. 2, 2007, U.S. Appl. No. 10/788,768, Feb. 27, 2004, 18 p.
Okkonen, Office Action Mar. 20, 2008, U.S. Appl. No. 10/788,768, Feb. 27, 2004, 16 p.
Okkonen, Office Action Oct. 2, 2008, U.S. Appl. No. 10/788,768, Feb. 27, 2004, 17 p.
Okkonen, Final Office Action Apr. 14, 2009, U.S. Appl. No. 10/788,768, Feb. 27, 2004, 18 p.
Qumei, Final Office Action Sep. 7, 2007, U.S. Appl. No. 10/770,983, Feb. 3, 2004, 15 p.
Qumei, Office Action Jan. 25, 2008, U.S. Appl. No. 10/770,983, Feb. 3, 2004, 18 p.
Qumei, Office Action Jul. 3, 2008, U.S. Appl. No. 10/770,983, Feb. 3, 2004, 22 p.
Qumei, Office Action Dec. 19, 2008, U.S. Appl. No. 10/770,983, Feb. 3, 2004, 19 p.
Qumei, Final Office Action Jun. 11, 2009, U.S. Appl. No. 10/770,983, Feb. 3, 2004, 21 p.
Hamasaki, Office Action Jan. 9, 2008, U.S. Appl. No. 10/748,053, Dec. 30, 2003, 18 p.
Hamasaki, Final Office Action Aug. 20, 2008, U.S. Appl. No. 10/748,053, Dec. 30, 2003, 21 p.
Hamasaki, Office Action Feb. 27, 2009, U.S. Appl. No. 10/748,053, Dec. 30, 2003, 19 p.
Hamasaki, Final Office Action Sep. 11, 2009, U.S. Appl. No. 10/748,053, Dec. 30, 2003, 19 p.
Hamasaki, Final Office Action May 17, 2010, U.S. Appl. No. 10/748,053, Dec. 30, 2003, 21 p.
Rao, Office Action Feb. 6, 2009, U.S. Appl. No. 10/754,378, Jan. 9, 2004, 14 p.
Rao, Final Office Action Jul. 13, 2009, U.S. Appl. No. 10/754,378, Jan. 9, 2004, 25 p.
Rao, Office Action May 17, 2010, U.S. Appl. No. 10/754,378, Jan. 9, 2004, 43 p.
Marolia, Office Action Oct. 17, 2006, U.S. Appl. No. 10/754,313, Jan. 9, 2004, 16 p.
Marolia, Office Action Feb. 20, 2008, U.S. Appl. No. 10/754,313, Jan. 9, 2004, 11 p.
Gustafson, Office Action Jan. 4, 2007, U.S. Appl. No. 10/756,103, Jan. 13, 2004, 10 p.
Gustafson, Office Action Aug. 10, 2007, U.S. Appl. No. 10/756,103, Jan. 13, 2004, 11 p.
Gustafson, Office Action Jan. 22, 2008, U.S. Appl. No. 10/756,103, Jan. 13, 2004, 11 p.

Gustafson, Office Action Jul. 8, 2009, U.S. Appl. No. 10/756,103, Jan. 13, 2004, 21 p.
Gustafson, Final Office Action Dec. 18, 2009, U.S. Appl. No. 10/756,103, Jan. 13, 2004, 22 p.
Chen, Office Action Jul. 23, 2007, U.S. Appl. No. 10/646,230, Aug. 22, 2003, 14 p.
Chen, Final Office Action Dec. 28, 2007, U.S. Appl. No. 10/646,230, Aug. 22, 2003, 14 p.
Chen, Office Action Dec. 23, 2008, U.S. Appl. No. 10/646,230, Aug. 22, 2003, 25 p.
Chen, Final Office Action May 27, 2009, U.S. Appl. No. 10/646,230, Aug. 22, 2003, 28 p.
Chen, Office Action Dec. 2, 2009, U.S. Appl. No. 10/646,230, Aug. 22, 2003, 15 p.
Chen, Office Action May 27, 2010, U.S. Appl. No. 10/646,230, Aug. 22, 2003, 17 p.
Chen, Final Office Action Nov. 10, 2010, U.S. Appl. No. 10/646,230, Aug. 22, 2003, 17 p.
Chen, Office Action Aug. 23, 2011, U.S. Appl. No. 10/646,230, Aug. 22, 2003, 6 p.
Marolia, Office Action Aug. 17, 2007, U.S. Appl. No. 10/852,396, May 24, 2004, 17 p.
Qumei, Office Action Jun. 20, 2007, U.S. Appl. No. 10/813,212, Mar. 30, 2004, 10 p.
Chen, Office Action Jun. 12, 2008, U.S. Appl. No. 10/646,230, Aug. 22, 2003, 14 p.
Chen, Office Action Dec. 7, 2005, U.S. Appl. No. 10/411,784, Apr. 11, 2003, 15 p.
Chen, Final Office Action Nov. 6, 2007, U.S. Appl. No. 11/125,974, May 9, 2005, 10 p.
Gustafson, Office Action Jan. 22, 2009, U.S. Appl. No. 10/756,103, Jan. 13, 2004, 15.p.
Qumei, Office Action, Apr. 13, 2007, U.S. Appl. No. 10/770,983, Feb. 3, 2004, 11 .p.
Muller, N.J., "Focus on OpenView a guide to Hewlett-Packard's Network and Systems Management Platform," pp. 1-291, CBM Books, published 1995.
Ilog, "Ilog Jrules—Complete business rule management," [Online] <http://www.ilog.com/products/jrules/datasheet> (May 2003).
Verbauwhede et al., "Low power DSP's for wireless communications (embedded tutorial session)", Aug. 2000, pp. 303-310. [Online] <http://delivery.acm.org/10.1145/350000/34464 7/p303-verbauwhede.pdf>.
"Over the Air User Initiated Provisioning Recommended Practice for the Mobile Information Device Profile", Version 1.0, May 7, 2001.
Oma, "SyncML Device Management Tree and Description, Version 1.1.2," Dec. 2, 2003, pp. 1-44.
Lucent Technologies, "Wireless Intelligent Network Over-the-Air Service Provisioning," Technical Brochure, [Online] <http://www.lucent.com/livelink/146175-Brochure.pdf>, 1997.
3GPP2 C:R1001-A 2.0: Administration of Parameter Value Assignments for cdma2000 Spread Spectrum Standards, Release A: Jul. 14, 2000.
Albright, Brian, "Managing the force: Planning makes the difference," Frontline Solutions, Jan. 2001, retrieved from scholar.google.com search Jun. 15, 2006.
Bailey, E. C., "Maximum RPM: Taking the Red Hat Package Manager to the Limit," Copyright 2000 by Red Hat, Inc., 14 p.
Baker et al., "Compressing Differences of Executable Code," 22 Apr. 1999.
Bokun et al. (Active Badges—The Next Generation, Linux Journa, Oct. 1998, Issue 54).
Brown, Michael et al., PGP in Constrined Wireless Devices, 1-23, 9th USENIX Security Symposium Paper 2000, retrieved Apr. 16, 2007.
Ortiz, C. Enrique, "Introduction to OTA Application Provisioning," Nov. 2002, [Online] http://developers.sun.com/techtopics/mobility/midparticles/ota/ retrieved on Mar. 29, 2007.
Microsoft, "Computer Dictionary," Microsoft Press Third Edition, pp. 88, 190, 1997.
Deitel & Deitel, "C How to Program," 1994, Prentice-Hall, Inc., Second Edition, Chapter 5.

Digital Cellular Telecomminications System (Phase 2+) AT Command Set for GSM Mobile Equipment (ME) (GSM 07.07 version 7.4.0 Release 1998), ETSI TS 100 916 V7.4.0 (Nov. 1999), 126 p.
Engstrom, Don, "Two Clicks to a Rejuvenated Mac: A Review of UpdateAgent—CD Edition," Feb. 20, 2002, pp. 1-3.
Eppstein, D., "Fast Hierarchical Clustering and Other Applications of Dynamic Closest Pairs," Jan. 31, 2001, pp. 1-10. [Online] http://www.ics.uci.edu/-eppstein/projects/pairs/Papers/Epp-SODA-98.pdf>.
Euroloader, "Technical Specification" Dec. 2001, ECCA Euroloader Specificaion, pp. 1-60.
Fowler et al., "Lossless Compression of Volumne Data," 1995, IEEE, pp. 43-50.
Funambol Inc., "Funambol DM Server Developer's Guide Version 3.0," Sep. 2006.
Guanluca, Moro, "On the Event Coordination in Multi-Component Systems," published 2002, pp. 315-322.
Hicks et al., Dynamic Software Updating, Jun. 2001. [Online] <citeseer.ist.psu.edu/336947.html>.
IEEE LAN MAN Standards Committee, "Draft Amendment to IEEE Standard for Local and Metropolitan Area Networks; Part 16: Air Interface for Fixed and Mobile Broadband Wireless Access Systems—Amendment to IEE Standards for Local and Metorpolitian Area Networks—Management Plane Procedures and Services," IEEE Draft Standards, No. 802. 16g-04/03, Dec. 2004, pp. 1-8, XP002469853.
Jansen et al., "Approx 2000, LNCS 1913," pp. 84-95, 2000, Springer-Verlag, Berlin Heidelberg 2000.
Luculli, Gabriele, "Efficient and Effective Simulation of Memory Maps for System-on-Chip," 11th IEEE Int'l. Conference and Workshop on the Engineering of Computer Baseed Systems, May 24-27, 2004, pp. 242-247.
Open Mobile Alliance, "Firmware Update Management Object," 2006.
Open Mobile Alliance, "OMA Device Management Security," Jul. 2005, Candidate Version 1.2.
Open Mobile Alliance, "SyncML Device Management Bootstrap," 2003.
Open Mobile Alliance, "Firmware Update Management Object," OMA-DM-V0_14-2004Oct28-D.
Open Mobile Alliance, "OMA Device Management Tree and Description_ver 1.2," Jun. 15, 2005 (OMA-TS-DM-TND-V1_2-20050615-C).
Paila et al. "FLUTE—File Delivery Over Unidirectional Transport," Network Working Group Request for Comments; 3926 Category; Experimental; Oct. 2004.
"Part 16: Air Interface for Fixed Broadband Wireless Access Systems," 22 Sep. 2005, pp. 1-257, XP007904329.
"Problem Tracking Task Reference," Continuus Software Corporation, Whole Manual, Part No. PTTR-041-011, 1996.
Riel, "Object-Oriented Design Heuristics," Apr. 30, 1996, Addison-Wesley Professional, Section 10.1.
Rodriguez et al., "TCP/IP Tutorial and Technical Overview," Copyright 2002, pp. 489-490.
Shapira et al., "In Place Differential File Compression," The Author 2005; Published by Oxford University Press on behalf of The British Computer Society; Advance Access published on Aug 26, 2005; 15 p.
Starlin, Mark, UpdateAgent 8, Nov. 19, 2002, pp. 1-2.
Symbian, "Symbian OS powered Sony Ericsson P800 Smartphone to ship in Q32003" Mar. 2002 pp. 1-2.
Tansley, "Linux and Unix Shell Programming," Dec. 27, 1999, Addison-Wesley Professional, 2 p.
The Mac Observer, Update Agent Scouts Out an Update for Itself, May 9, 2000, pp. 1-3.
TIA/EIA/IS-683-A: Over-the-Air Service Provisioning of Mobile Stations in Spread Spectrum Systems: May 1998.
Veeraraghavan et al., "A distributed control strategy for wireless ATM networks," pp. 323-339, Wireless Networks 1995, retrieved from ACM database search Jun. 15, 2006.
Yang et al., "Reuse Linux Device Drivers in Embedded Systems," 1998 International Computer Symposium Workshop on Software Engineering and Database Systems Dec. 17-19, 1998.

Yau et al., "An approach to distributed component-based real-time application software development," 1998, pp. 275-283.

* cited by examiner

PATTERN DETECTION PREPROCESSOR IN AN ELECTRONIC DEVICE UPDATE GENERATION SYSTEM

CROSS-REFERENCE TO RELATED APPLICATIONS/INCORPORATION BY REFERENCE

This application makes reference to and claims priority based on the following provisional applications, the complete subject matter of each of which is incorporated herein by reference in its entirety.

| Ser. No. | Title | Filed | Inventors |
| --- | --- | --- | --- |
| 60/373,421 | Pattern Detection Preprocessor in an Update Generation System | Apr. 12, 2002 | Chen O'Neill Rao Lilley |
| 60/373,422 | Update Package Generation and Distribution Network | Apr. 12, 2002 | O'Neill Rao |
| 60/373,423 | Layout Preprocessor in an Update Generation System | Apr. 12, 2002 | Chen O'Neill |
| 60/372,066 | Memory Initialization System for Initializing a Memory Image with a Pattern | Apr. 12, 2002 | Chen O'Neill |

This application is a continuation-in-part of U.S. patent application Ser. No. 10/311,462, "System and Method for Updating and Distributing Information", filed May 13, 2002, which is the National Stage filing of PCT Application Ser. No. PCT/US01/44034, "System and Method for Updating and Distributing Information", filed Nov. 19, 2001, which claims priority to U.S. Provisional Patent Application Ser. No. 60/249,606, filed Nov. 17, 2000, the complete subject matter of each of which is incorporated herein by reference in its entirety.

This application is also related to the following co-pending applications, each of which is hereby incorporated herein by reference in its entirety:

| Ser. No. | Title | Filed | Inventors |
| --- | --- | --- | --- |
| | Update Package Generation and Distribution Network | Apr. 11, 2003 | O'Neill Rao |
| | Initialization and Update of Firmware in Electronic Devices | Apr. 11, 2003 | Chen O'Neill Lim Jacobi Sotos |

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

When a block of binary code associated with a software application in memory, such as flash memory, RAM memory, ROM memory, etc. has to be updated, as part of a version upgrade or as part of a bug-fix process, there are several issues to be considered. For one, the newer version of the software may differ significantly from an existing version in terms of size, functionality, etc. The newer version of the software may not fit into the space occupied by the existing version. Attempts to replace the existing version with the newer version by actual replacement of specific blocks of code with others may cause the relocation of several other blocks of code not directly related to the segment of code being replaced. Such relocations have several side-effects requiring the modifications of addresses and/or instructions in the relocated code in-order to keep them executable and operational.

The size of the update packages that may be sent to an electronic device as part of an update process is often of very important concern. Some electronic devices may be constrained in resources and unable to field the update packages sent to them. Even if they can store update packages sent to them, these electronic devices often lack additional free memory necessary to execute the instructions necessary to complete the update process.

It may be possible to reduce the size of an update package containing a new version of software that is sent to electronic devices. One important problem that needs to be solved while trying to reduce the size of an update package that is sent to electronic devices is the determination of code that is the same or similar in both existing and new software modules. Due to relocation of some code segments in the new memory image of the electronic device as compared to the existing memory image, often the same or similar software modules appear significantly different.

A related problem in determining how new memory images of software modules are different from existing memory images of the same software modules is the issue of byte alignments of data and operational codes. Two software modules that are essentially the same may occupy different amounts of memory if the layout of data and or code in one of the memory images forces the relocation of addresses due to alignment related issues.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the present invention may be seen in a generator for producing an update package using a first binary image and a second binary image. The generator may comprise a comparator for determining at least one difference between the first binary image and the second binary image, and an encoder for encoding the at least one difference as at least one of addition to, deletion from, and modification of the first binary image using the second binary image, the encoded at least one difference collectively forming the update package. In an embodiment of the present invention, the encoder may use at least one heuristic.

In an embodiment of the present invention, the generator may further comprise a preprocessor for preprocessing before the encoding one of the first binary image and the second binary image, and the preprocessor may have at least a first mode and a second mode of operation. The first mode of operation may comprise modifying the first binary image to more closely match the second binary image, and the second mode of operation may comprise modifying the second binary image to more closely match the first binary image. The mode of operation may be selected using at least one heuristic.

Another aspect of the present invention may be observed in a method of operating a generator, the generator producing an update package using a first binary image and a second binary image. In such an embodiment, the method may comprise comparing the first binary image and the second binary image to determine at least one difference, and encoding the at least one difference as at least one of an addition to, a deletion from, and a modification of at least one portion of the first binary image using at least one portion of the second binary image, the encoded at least one difference collectively forming the update package. The encoding may use at least one heuristic.

The method may further comprise preprocessing before the encoding one of the first binary image and the second binary image, and the preprocessing may have a mode of operation comprising at least a first mode and a second mode. The first mode of operation may comprise modifying the first binary image to more closely match the second binary image, where the modifying may comprise at least one of relocating at least one portion of the first binary image and replacing at least one of an address or an offset within the first binary image with a predetermined value. The second mode of operation may comprise modifying the second binary image to more closely match the first binary image, where the modifying comprises at least one of relocating at least one portion of the second binary image and replacing at least one of an address or an offset within the second binary image with a predetermined value. In addition, the preprocessing may use at least one heuristic, and may produce a map table representative of the preprocessing performed.

A further embodiment of the present invention may include machine-readable storage, having stored thereon a computer program having a plurality of code sections executable by a machine for causing the machine to perform the foregoing.

These and other advantages, aspects, and novel features of the present invention, as well as details of illustrated embodiments, thereof, will be more fully understood from the following description and drawings.

DETAILED DESCRIPTION OF THE INVENTION

Aspects of the present invention relate generally to the update of software in electronic devices, and more specifically, to the efficient generation and subsequent execution of software and/or firmware update activities in electronic devices.

Figure 1:
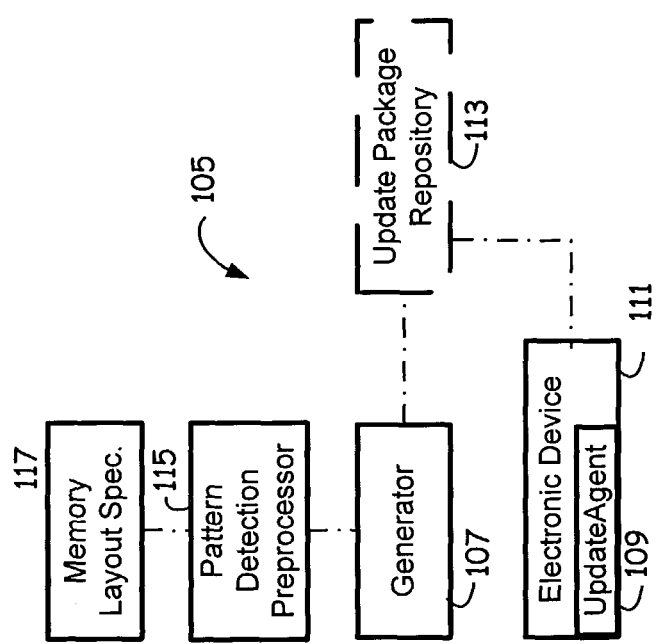
FIG. 1 is block diagram of an exemplary update generation system, in accordance with an embodiment of the present invention.

FIG. 1 is block diagram of an exemplary update generation system 105, in accordance with an embodiment of the present invention. The update generation system 105 comprises a generator 107, an electronic device 111 with an update agent 109, a pattern detection preprocessor 115, and an optional update package repository 113. The generator 107 generates update packages using a memory layout specification 117. The update agent 109 may apply the update packages onto the electronic device 111 to upgrade any software and/or firmware resident in the electronic device 111. The pattern detection preprocessor 115 facilitates the generation of efficient and compact update packages by detecting operation code patterns. The generator 107 creates an update package for the electronic device 111 using a map table created by the pattern detection preprocessor 115. The generator 107 may also store the update package in the optional update package repository 113, from which it may be subsequently retrieved and processed along with its associated map table by the electronic device 111.

In the illustration of FIG. 1, the pattern detection preprocessor 115 facilitates the determination of similarities, and more specifically the occurrence of similar operation code patterns, in software and/or firmware modules in an existing memory image for the electronic device 111 and software and/or firmware modules in a new memory image for the same or similar electronic device 111. The pattern detection preprocessor 115 generates a map table that may be employed by the generator 107 in creating efficient update packages (smaller in size than would otherwise be the case), and also by the update agent 109 to implement post-update processing. In addition, the map table may be stored in the update package repository 113 and delivered to the electronic device 111 as required to apply a given update package. The map table may be retrieved by the electronic device 111 from update package repository 113 along with an update package for an existing memory image and may be employed by the update agent 109 in a post-update task, after the existing memory image in the electronic device 111 has been updated. The post-update task may involve relocating code segments or software and/or firmware modules to the positions assigned to them in the new memory image using the map table information.

The pattern detection preprocessor 115 recognizes the similarities between software and/or firmware segments or modules in an existing memory image for the electronic device 111 and a new memory image for the same or similar electronic device 111. Similarities between software and/or firmware segments or modules are recognized by the pattern detection preprocessor 115 despite relocation of such code in the new memory image.

In one embodiment, the similarities between software and/or firmware segments or modules may be determined based on applying pattern recognition techniques, primarily aimed at recognizing patterns of operation code. In such an embodiment, the existing and new memory images may be scanned for patterns of operation code that appear similar, and the location and length information in the memory images for each of the patterns of operation code that match may be stored for further processing.

Recognizing similar patterns of operation code may involve, among other tasks, comparing sequences of operation code in the existing memory image with sequences of operation code in the new image in order to determine if they are similar. The comparison of sequences of operation code may be further facilitated by initially (before comparing) encoding or replacing data and memory addresses with a different pattern that distinguishes them easily from valid operational codes. By doing so, the ability to distinguish valid sequence of operation code from other information is greatly enhanced. The map table created may contain, for example, a reference to each matching code pattern, its address in the existing memory map, its address in the new memory map, and the length of the matching code pattern.

The ability to compare sequences of operation code in the existing memory image and recognize similar patterns of operation codes in the new memory image may be further enhanced by adjusting the alignments of code and data sequences before comparing them. Once the code segments that are similar are identified, the new memory image may be made to resemble the existing memory image so as to minimize the size of the update package to be created.

In one embodiment, the new memory image may be made to look like the existing memory image so as to minimize the size of an update package. This may involve changing offsets in op codes and addresses in op codes in the new memory image using the map table. This process may involve changing the values of, for example, addresses, offsets, jump instructions, and subroutine branches in the software modules or code segments in the new memory image that are recognized as reproductions of a corresponding one from the existing memory image. After selectively altering the values of offsets, addresses, jump instructions, etc., the same code segment in the new memory image may be made to resemble the version in the existing memory image. Subsequent generation of an update package provides a smaller, simpler and more efficient update package. The update package as well as the map table may be delivered to the electronic device. In this situation, the update agent may first apply the update package and then reverse the values of addresses, offsets, jump instructions, subroutine branches, etc. in the software modules or code segments so as to re-create the new memory image.

In another embodiment, the new memory image may be made to look like the existing memory image so as to minimize the size of an update package. This may involve relocating specific code segments in the new memory image to positions occupied by the segment in the existing memory image, selectively altering the offsets and addresses for the op codes in the new memory image using the map table before generating an update package. Once the code segments that are similar have been identified, the relocation of code segments or operation code sequences in the new memory image to locations occupied by them in the existing memory image allows the generation of compact update packages by the generator 107.

Both of the embodiments described above for making the new memory image look like the existing memory may be combined in yet another embodiment. For example, code segments may be relocated and the addresses of op code instructions, offsets, jumps, etc. may also be modified.

In an embodiment of the present invention, the generator 107 may create an update package for the electronic device 111 by comparing an existing version of software to a newer version of the same software, computing the differences, and specifying the differences as a combination of data and instructions to be executed. By relocating code that appears similar or the same, and by making the new image more closely resemble the existing image, the size of the update packages may be significantly reduced, i.e. the number of instructions and the size of data involved in such instructions may be reduced. The relocation-related information may be saved in a map table to be used later by the update agent 109 in the electronic device 111 in reversing the process of update package generation. The update agent 109 in the electronic device 111 may apply the update package onto the electronic device 111 by processing the data and/or executing the instructions provided within the update package. At the end of this process, the update agent may execute post-processing instructions employing the map table provided. In order to reduce update package sizes, for example, the update agent 109 may relocate some segments of the code that were initially relocated by the pattern detection preprocessor 115. The size of a generated update package is thus minimized by the incorporation of the additional pre-processing and associated post-processing steps.

The memory layout specification 117 may specify information regarding, for example, the number and size of memory banks in the device, the size of the code and data segments to be employed, and the location of the code segments and data segments. The memory layout specification 117 may also be accessed by the generator 107 to create the update packages. In one embodiment of the present invention, the memory layout specification 117 employed by the generator 107 may be contained within the pattern detection preprocessor 115 and may be employed by the pattern detection preprocessor 115 to analyze the code, data segments, etc. in the memory images, both in the existing memory image and in the new memory image. In another embodiment, the memory layout specification 117 may be retrieved by the pattern detection preprocessor 115 from an external system.

Figure 2A:
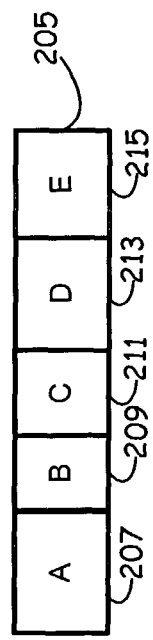
FIG. 2A is a block diagram of an exemplary layout of software modules in an existing memory image of an electronic device such as the electronic device of FIG. 1 in which the software modules A, B, C, D and F are laid out adjacent to each other.

FIG. 2A is a block diagram of an exemplary layout of software modules in an existing memory image 205 of an electronic device such as the electronic device 111 of FIG. 1 in which the software modules A, B, C, D and F are laid out adjacent to each other. The software modules A 207, B 209, C 211 and D 213 may or may not be related to each other. Because they are adjacent to one another without significant free memory between them, they cannot be modified or upgraded without requiring the relocation of addresses and references in another module, especially those that "follow" the changed module. For example, replacing an existing version of software module A 207 with a new version of software module A 207 may require more or less memory space and may involve relocating some or all of modules B 209, C 211, and D 213. Thus, a new version of the memory image with a newer version of the software for module may cause the relocation of all the other software modules B 209, C 211, D 213 and E 215 in the new memory image. A relocation of software and/or firmware modules or segments generally necessitates, for example, changing the addresses of software jumps and changing references to addresses, to name just two items. Thus, there may be a sort of "avalanche" effect in which minor changes or upgrades to software module A 207 result in a large number of changes to other modules.

Figure 2B:
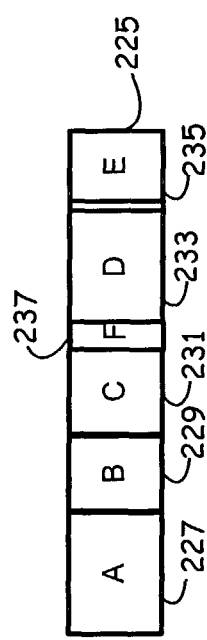
FIG. 2B is block diagram of another exemplary layout of software modules in a new memory image of an electronic device in which some of the software modules of the memory image from FIG. 2A have been relocated to new addresses and have changed in size.

FIG. 2B is block diagram of another exemplary layout of software modules in a new memory image of an electronic device such as electronic device 111 of FIG. 1, in which some of the software modules of the existing memory image 205 of FIG. 2A have been relocated to new addresses and are also different in size. Specifically, modules A 207, B 209 and C 211 from existing memory image 205 of FIG. 2A are similar to corresponding software modules A 227, B 229 and C 231 in the new memory image 225. However, in the new memory image 225, module D 233 has changed in size from corresponding module D 213 of existing memory image 205. It has also been relocated to a new location. In addition, a free memory block F 237 is available in the new memory image 225 and software module E 235 has changed in size and location.

The pattern detection preprocessor, such as pattern detection preprocessor 115 of FIG. 1, may be used to recognize the similarities in software modules D of the existing memory image 205 and the new memory image 225. After comparing the code segments of the two different memory images, pattern detection processor 115 may create entries in the memory map table that specify the location and size of code segments in the existing memory image 205 corresponding to code segments that are also found in the new memory image 225. For example, for module D 213, 233, one or more entries may be made for code segments that are found in both the existing and the new memory images.

In one embodiment of the present invention, the addresses, offsets, jump instructions, etc. in the code segments of the new memory image 225 may be set to their corresponding values in the existing memory image by the pattern detection preprocessor 115, using the map table. The map table may be used to record such changes so that they may be reversed by the electronic device 111 in a post-processing phase.

In another embodiment in accordance with the present invention, code segments in the new memory image 225 may be relocated to their corresponding location in the existing memory image by the pattern detection preprocessor 115, using the map table. An update package may then be created by a generator, such as generator 107 of FIG. 1. Using this approach, the update package is smaller in size and require fewer instructions than without such a preprocessor facility.

Figure 3:
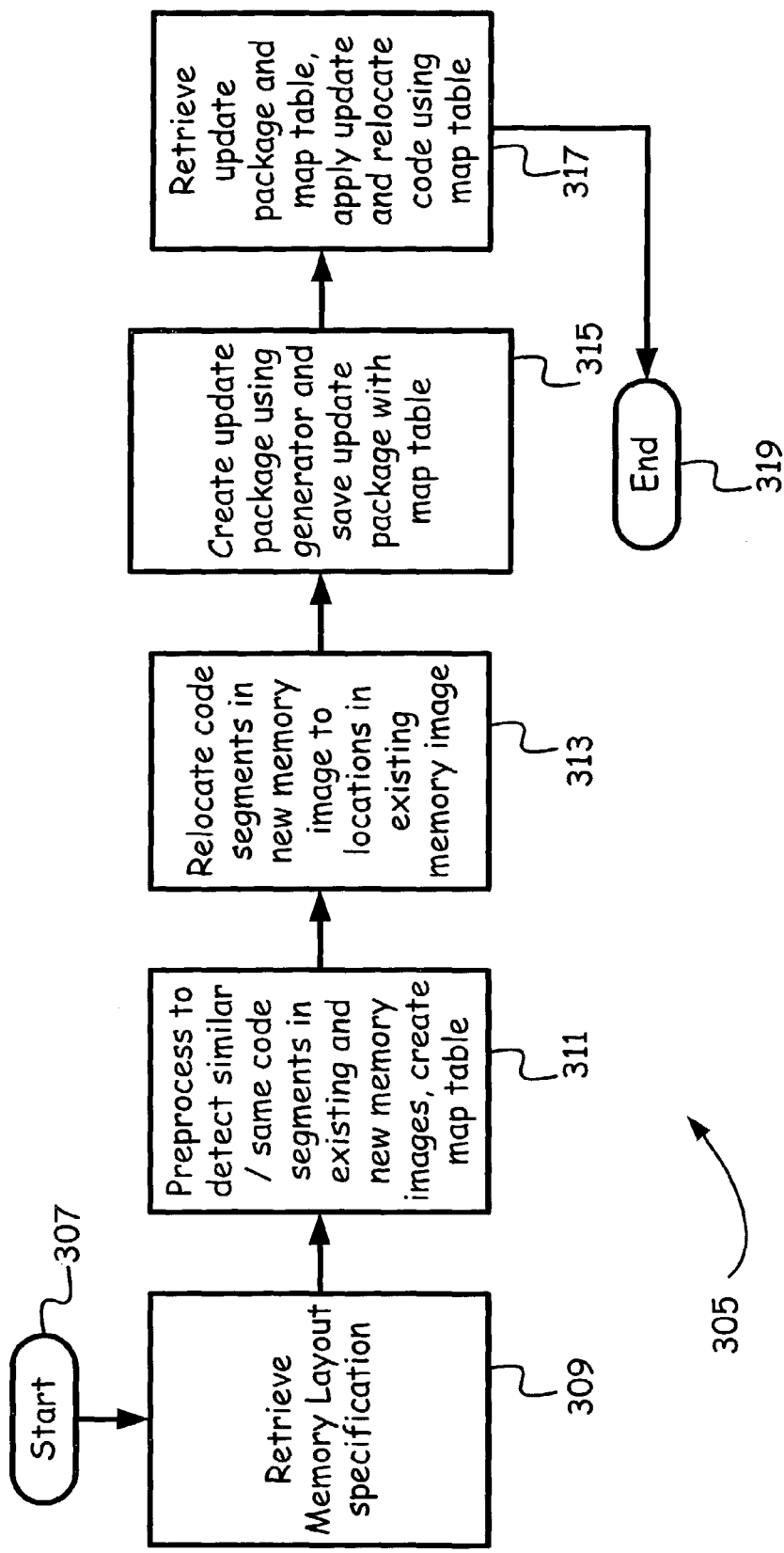
FIG. 3 is a flow chart illustrating an exemplary end-to-end update process, in accordance with an embodiment of the present invention.

FIG. 3 is a flow chart illustrating an exemplary end-to-end update process, in accordance with the present invention. The processing starts (block 307), with the execution of the pattern detection preprocessor. Next, the memory layout specification is optionally retrieved (block 309). This may be used to pre-process a new memory image by comparing it to an existing memory image. Pre-processing (block 311) facilitates the detection of the same or similar code segments in existing and new memory images for an electronic device, such as electronic device 111 of FIG. 1. A map table is created that comprises the information used to prepare the new memory image for the generation of a compact update package. Once the map table is created, it is saved.

The new memory image is then modified (block 313) using the map table, to prepare it for the generation process. Relocation of code segments in the new memory image may be necessary to make the new memory image resemble the existing or reference memory image as closely as possible. An update package is created by the generator (block 315) and the update package is saved in a repository along with the associated map table.

The update package and its associated map table are retrieved by an update agent in the electronic device, and the instructions in the update package are executed to recreate the modified version of the new memory image (block 317). The new memory image is recreated and applied by the update agent in post-processing steps to the existing memory image of the electronic device, by selectively applying relocation instructions to the modified version of the new memory image, using the map table. Upon completion, processing stops (block 319).

Figure 4:
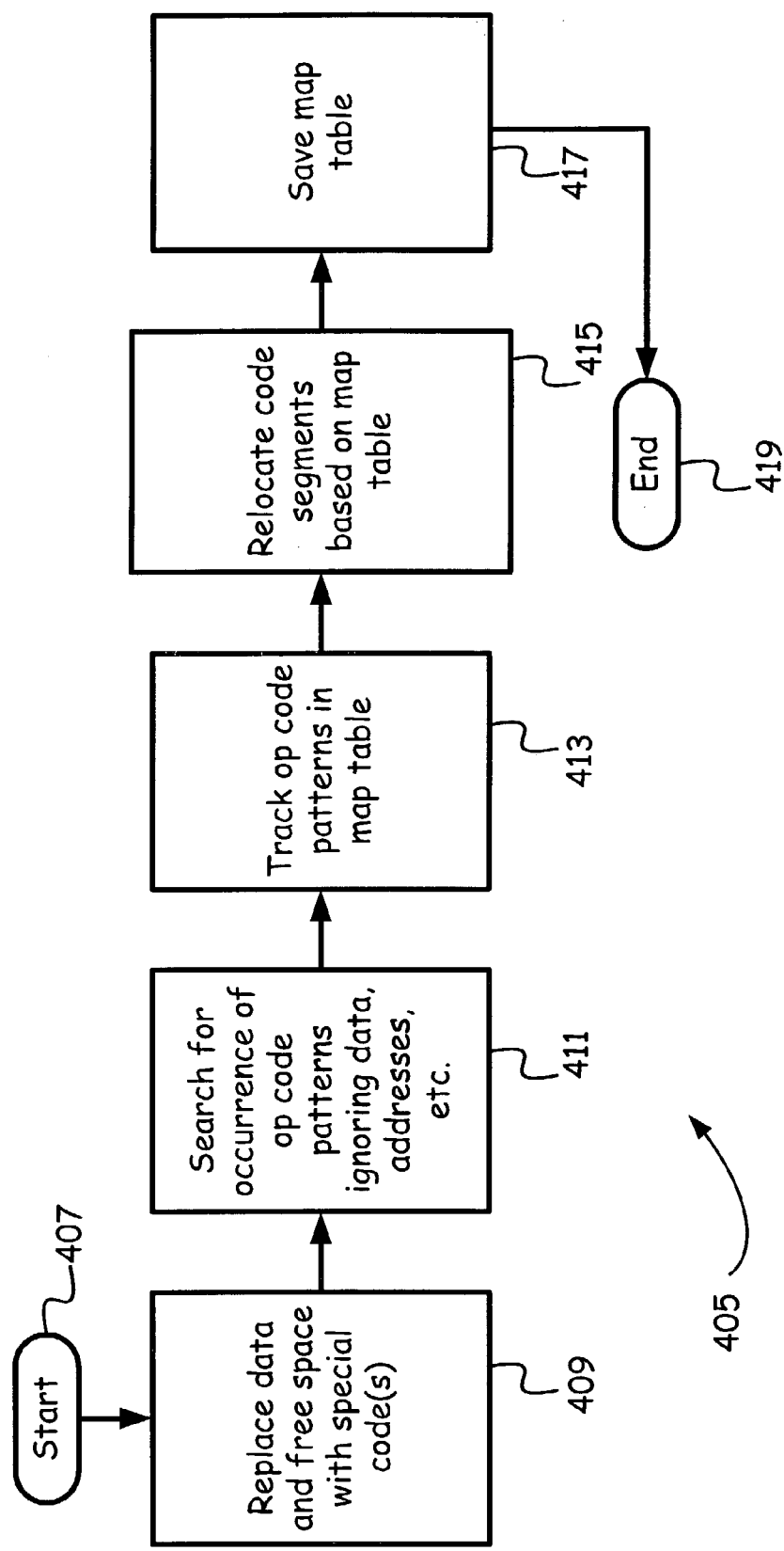
FIG. 4 is a flow chart illustrating the pre-processing steps executed by an exemplary pattern detection pre-processor, in accordance with an embodiment of the present invention.

FIG. 4 is a flow chart illustrating the pre-processing steps executed by an exemplary pattern detection pre-processor such as pattern detection preprocessor 115 of FIG. 1, in accordance with an embodiment of the present invention. The pre-processing starts (block 407) when an existing memory image, a new memory image, and a memory layout specification are accessed. The data and free memory bytes in the new memory image are replaced (block 409) by special codes that make it easy to distinguish them from valid operational codes (also called op codes). A search is then conducted (block 411) to identify all possible matching op code segments in the existing memory image and the new memory image. All instances of op code segments in the existing memory image that also occur in the new memory image are tracked. All matches within a specified tolerance limit are also tracked.

A map table is created (block 413) by applying heuristics to the information on op code pattern segments that match. In one embodiment of the present invention, the map table may be used to relocate code segments (block 415) in the new memory image to make it resemble the existing memory image (or a reference memory image) as much as possible. The modified new memory image is then ready for the update package generation process. Such relocation reduces the size of update packages that are generated by the generator by comparing the existing and the modified new memory image as part of the generation process. In another embodiment, the new memory image may be made to resemble the existing memory image (or a reference memory image), as much as possible, by altering addresses, offsets, jumps, etc. and tracking such alterations in the map table.

Subsequently, the map table is associated with the new memory image and stored. Processing then stops (block 419).

In another embodiment of the present invention, the existing memory image of the electronic device may be modified to resemble, as closely as possible, the new memory image by means of the pattern detection preprocessor, such as pattern detection preprocessor 115 of FIG. 1. In such an embodiment, an update package may be generated that facilitates translating a modified existing memory image into the new memory image. The map table may contain information that facilitates such a conversion. In such an embodiment, a pre-processing step using the map table may convert the existing memory image into a modified memory image that is ready for the application of the update package. In this embodiment, a pre-processor step that employs the map table precedes the application of the update package by the update agent in the electronic device.

In general, if the new memory image has deleted some old applications or removed some code, making the existing image look like the new memory image may be more effective.

Any of the following seven combinations of adding new code, deletion of existing code, and modification of existing code may be used:
 a. addition of new code,
 b. deletion of existing code,
 c. addition of new as well as deletion of existing code,
 d. modification of existing code,
 e. addition of new code, and deletion and modification of existing code,
 f. addition of new code and modification of existing code,
 g. deletion of existing code and modification of existing code.

The three operations of addition, deletion and modification, may be incorporated in the generation of a new memory image. Heuristics may be used to determine if it is more effective to make the existing memory image resemble the new memory image, or vice versa.

The following exemplary heuristics may be employed:

For combinations (b) and (g) listed above, where the new image is primarily the result of deletions or a combination of deletions and modifications of some software and/or firmware modules or code segments, the process of making the existing memory image match the new image may be employed.

For combinations (a) and (f) listed above, the process of making the new memory image match the existing memory image may be employed.

Other heuristics may also be employed.

In yet another embodiment, a number of update packages and map tables may be generated using several different heuristics, and one of the update packages selected for use based on a specific criteria such as the size of the update package, the amount of time needed for the execution of the instructions in the update package, etc.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. An update generation system, comprising:
   a general-purpose computer system including:
      a processor to:
         determine similar operation code in both an existing memory image and a new memory image, the existing memory image stored in an electronic device,
         generate a map table including addresses of the similar operation code in the existing memory image and the new memory image, and
         using the map table, relocate code segments in the new memory image to make the new memory image resemble the existing memory image; and
      a generator to:
         generate an update package including the new memory image and the map table, and
         deliver the update package to the electronic device to update the electronic device with the new memory image.

2. The update generation system of claim 1, wherein the processor recognizes patterns in operation code to determine the similar operation code in both the existing memory image and the new memory image.

3. The update generation system of claim 1, wherein the processor replaces data and memory addresses in the existing memory image and the new memory image with a different pattern to distinguish the data and memory addresses from valid operational codes.

4. The update generation system of claim 1, wherein the processor scans the existing memory image and the new memory image for patterns of operation code that match each other and stores location and length information of the patterns of operation code that match each other in the map table.

5. The update generation system of claim 1, wherein the processor compares sequences of operation code in the existing memory image with sequences of operation code in the new memory image to determine whether the sequences of operation code in the existing memory image are similar to the sequences of operation code in the new memory image.

6. A method executed by a computer system, comprising:
   comparing, by the computer system, operation code in an existing memory image stored in an electronic device with operation code in a new memory image to determine matching operation code in both the existing memory image and the new memory image;
   changing, by the computer system, values of offsets and values of addresses in operation code in the new memory image to make a modified new memory image resembling the existing memory image; and
   delivering, by the computer system, an update package including the modified new memory image to the electronic device, wherein the existing memory image of the electronic device is to be updated using the modified new memory image.

7. The method of claim 6 further comprising:
   saving, as relocation information in a mapping table, changes of the values of the offsets and the values of the addresses in the operation code in the new memory image; and
   delivering the mapping table with the relocation information to the electronic device.

8. The method of claim 6 further comprising:
   relocating code segments in the new memory image to positions occupied by code segments in the existing memory image to make the modified new memory image resemble the existing memory image.

9. The method of claim 6 further comprising:
   changing values of jump instructions and subroutine branches in the new memory image to make the modified new memory image resemble the existing memory image.

10. The method of claim 6 further comprising:
determining a valid sequence of operation code from other information by replacing data and memory addresses in the existing memory image and in the new memory image with a different pattern that distinguishes the data and memory addresses from valid operational codes.

11. The method of claim 6 further comprising:
before the comparing, adjusting both alignments of code and data sequences in the existing memory image and the new memory image to enhance recognizing patterns of code in the existing memory image and the new memory image.

12. A system, comprising:
an electronic device that stores an existing memory image;
a pattern detection processor that identifies matching operation code in the existing memory image and an update memory image, and relocates code segments in the update memory image to make the update memory image resemble the existing memory image;
an update repository that stores a mapping table that includes addresses that specify locations for the matching operation code in the existing memory image and the update memory image; and
a generator that generates an update package that includes the update memory image and the mapping table, and delivers the update package to the electronic device, wherein the update package is applied to the electronic device to update the existing memory image to the update memory image.

13. The system of claim 12, wherein, using the mapping table, the pattern detection processor relocates code segments in the update memory image to make the update memory image resemble the existing memory image.

14. The update generation system of claim 1, wherein, using the map table, code segments of the operation code are relocated to positions assigned in the new memory image after the electronic device is updated with the new memory image.

15. The method of claim 7 further comprising:
after the existing memory image of the electronic device is updated, relocating, using the mapping table, code segments of the operation code to positions assigned in the new memory image.

16. The system of claim 12, wherein, after the update package is applied to the electronic device, relocation of code segments in the update memory image is reversed to recreate the update memory image.

* * * * *